United States Patent
Olson

(10) Patent No.: US 8,243,326 B2
(45) Date of Patent: Aug. 14, 2012

(54) METHODS AND APPARATUS FOR COLOR PROFILE EDITING

(75) Inventor: Thor A. Olson, Minnetonka, MN (US)

(73) Assignee: Electronics for Imaging, Inc., Foster City, CA (US)

( * ) Notice: Subject to any disclaimer, the term of this patent is extended or adjusted under 35 U.S.C. 154(b) by 1008 days.

(21) Appl. No.: 11/530,793

(22) Filed: Sep. 11, 2006

(65) Prior Publication Data

US 2008/0062442 A1    Mar. 13, 2008

(51) Int. Cl.
*H04N 1/60*   (2006.01)
*G03F 3/08*   (2006.01)
*G03F 3/10*   (2006.01)

(52) U.S. Cl. ......... 358/1.9; 358/518; 358/520; 358/527; 358/537; 382/167

(58) Field of Classification Search .................... 358/1.9, 358/518, 527, 537; 382/167
See application file for complete search history.

(56) References Cited

U.S. PATENT DOCUMENTS

| | | | | |
|---|---|---|---|---|
| 5,604,610 | A * | 2/1997 | Spaulding et al. | 358/525 |
| 5,740,076 | A * | 4/1998 | Lindbloom | 345/590 |
| 5,815,642 | A * | 9/1998 | Kumada | 358/1.9 |
| 5,987,165 | A * | 11/1999 | Matsuzaki et al. | 382/162 |
| 6,061,153 | A | 5/2000 | Sugita | |
| 6,456,293 | B1 * | 9/2002 | Grandy | 345/591 |
| 6,473,104 | B1 | 10/2002 | Harris | |
| 6,525,721 | B1 | 2/2003 | Thomas et al. | |
| 7,136,188 | B2 * | 11/2006 | Kondo | 358/1.9 |
| 7,233,694 | B2 * | 6/2007 | Fukui | 382/162 |
| 7,339,700 | B2 * | 3/2008 | Ohga et al. | 358/1.9 |
| 7,385,739 | B2 * | 6/2008 | Ohga et al. | 358/518 |
| 7,433,102 | B2 * | 10/2008 | Takahashi et al. | 358/518 |
| 7,440,123 | B2 * | 10/2008 | Chodagiri et al. | 358/1.13 |
| 7,477,286 | B2 * | 1/2009 | Engholm | 348/185 |
| 7,486,300 | B2 | 2/2009 | Rose | |
| 7,509,271 | B2 | 3/2009 | Uchimi et al. | |
| 7,522,307 | B2 * | 4/2009 | Sawada | 358/1.9 |
| 7,525,685 | B2 * | 4/2009 | Maniam et al. | 358/1.9 |
| 2003/0053094 | A1 * | 3/2003 | Ohga et al. | 358/1.9 |

(Continued)

FOREIGN PATENT DOCUMENTS

EP  1294177 A2  3/2003

(Continued)

OTHER PUBLICATIONS

X-Rite, Inc, MonacoPROFILER Family, http://www.xrite.com/product_overview.aspx?Action=support&ID=1169, retrieved: Dec. 21, 2009.*

(Continued)

*Primary Examiner* — Richard Zhu
(74) *Attorney, Agent, or Firm* — Michael A. Glenn; Glenn Patent Group

(57) ABSTRACT

Apparatus and methods are provided for editing color profiles. In particular, input data (such as reference image data) are received, and then are converted to first output data using a first color profile and to second output data using a second color profile, wherein the second color profile is an edited version of the first color profile. Soft proof data corresponding to the input data, first output data and second output data are calculated and then displayed on a display device. The soft proof data corresponding to the input data, first output data and second output data may be simultaneously or selectively displayed on the display device.

54 Claims, 29 Drawing Sheets

U.S. PATENT DOCUMENTS

| | | | |
|---|---|---|---|
| 2003/0103234 A1 | 6/2003 | Takabayashi et al. | |
| 2003/0184557 A1 | 10/2003 | Wen | |
| 2003/0234880 A1* | 12/2003 | Fukui | 348/272 |
| 2004/0169751 A1* | 9/2004 | Takemura et al. | 348/294 |
| 2004/0201598 A1* | 10/2004 | Eliav et al. | 345/698 |
| 2005/0083346 A1* | 4/2005 | Takahashi et al. | 345/600 |
| 2005/0134879 A1 | 6/2005 | Fuchs et al. | |
| 2005/0140693 A1* | 6/2005 | Kim et al. | 345/600 |
| 2006/0050320 A1* | 3/2006 | Ozaki et al. | 358/3.29 |
| 2006/0192996 A1* | 8/2006 | Yamamoto et al. | 358/1.15 |

FOREIGN PATENT DOCUMENTS

| | | |
|---|---|---|
| EP | 1357736 A2 | 10/2003 |
| JP | H07-162694 | 1/1997 |
| JP | 11053160 | 2/1999 |
| JP | 2003-087591 | 3/2003 |
| JP | 2004-153686 | 5/2004 |
| WO | PCT/US2007/077431 | 2/2008 |
| WO | PCT/US2007/077448 | 4/2008 |

OTHER PUBLICATIONS

MonacoPROFILER User Guide, 2005, X-Rite, Inc.

* cited by examiner

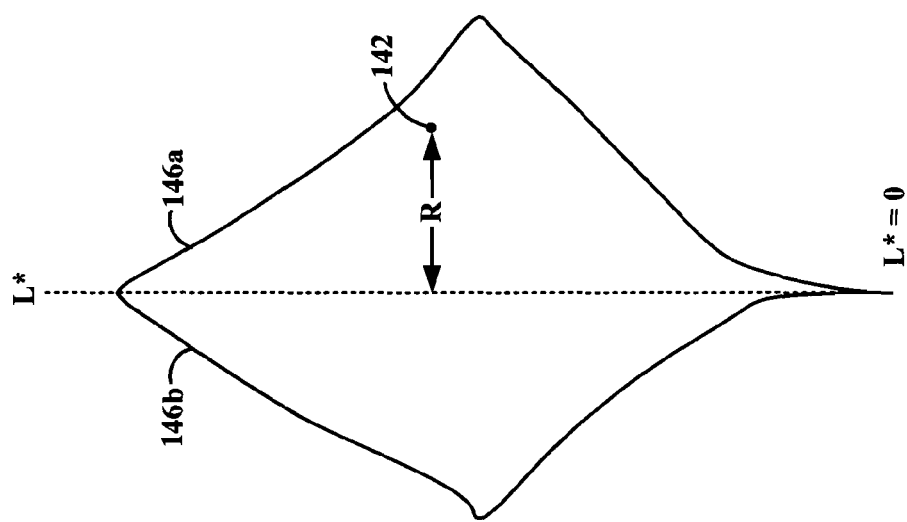

METHODS AND APPARATUS FOR COLOR PROFILE EDITING

BACKGROUND

This invention relates to color image processing. More particularly, this invention relates to methods and apparatus for editing color profiles, such as color profiles for color output devices.

A color profile generally includes a transform from a profile connection space, such as Commission Internationale de l'Eclairage ("CIE") XYZ color space, CIE L*a*b* color space, or other similar color space, to a device space (the "reverse transform"), and a transform from the device space to the profile connection space (the "forward transform"). For example, a color profile for an output device (referred to herein as an "output profile"), includes transformations between the color space of the output device and the profile connection space. Thus, if an output device is a four-color printer that uses cyan, yellow, magenta and black ("CMYK") colorants, the reverse transform may be used to convert device-independent L*a*b* color values to equivalent device-dependent CMYK colorant values, and the forward transform may be used to convert device-dependent CMYK colorant values to device-independent L*a*b* color values.

To create an color profile for an output device, such as a color printer, copier, offset press, display device, or other similar output device, a test chart including numerous color patches is printed by or displayed on the output device. Exemplary test charts include IT8, EC12002, and other similar test charts. Next, a measurement device, such as a calorimeter, spectrophotometer, spectrocolorimeter, or other similar device is used to obtain spectral or calorimetric data that describes each printed or displayed patch. The measured data are then provided to profile generation software, which calculates a color profile based on the spectral or calorimetric measurements. Profile generation software may be any conventional profile generation software, such as the EFI Color Profiler software, licensed by Electronics for Imaging, Inc., Foster City, Calif., U.S.A., or other similar profile generation software.

The created color profile may then be used to print or display color images on the profiled output device. A user may find, however, that printed or displayed images using the color profile produce unacceptable results. For example, a printed image may have color shifts, such as white to blue shifts toward purple. Alternatively, the user may perceive hue shifts along blends, or may notice that the gray balance is not quite right. In the past, a user facing such problems might attempt to manually edit the color profile. Often times, however, an inexperienced user would not know how to edit the color profile, or might edit the profile in a way that did not solve the problem, made the problem worse, or created new problems.

To overcome these problems, some previously known software programs have been developed to simplify the color profile editing process. The programs typically permit a user to select a color profile for editing, and a reference image for evaluating the effects of the edits. Some previously known software programs display "before" and "after" soft proof images to allow a user to visually see the effects of the edits on the reference image. The applications also typically provide tools for editing the profile. For example, some previously known profile editing programs include "curves" tools or slider bars that allow a user to create global shifts in the lightness, saturation and colors in the image. In addition, some previously known profile editor tools allow a user to change specific color regions in the color profile. Such "selective color edit" tools typically provide a sampling tool to allow a user to sample a color from the reference image, and also provide slider bars that allow a user to change individual color values of the sampled color, such as the sample's L*a*b* values.

Although previously known color profile editor programs have many useful features, the applications often have several shortcomings. In particular, previously known color profile editing tools provide limited information about the profile being edited, and the available gamut of the associated output device. For example, although several programs display "before" and "after" soft proofs of the reference image using the unedited and edited profiles, the programs do not provide soft proofs of the original source image. Further, previously known solutions do not display color difference information between colors in the reference image and the printed or displayed image using the edited profile, or between colors in the printed or displayed image using the unedited and edited profiles.

Moreover, previously known selective color edit tools often restrict the manner in which information may be displayed regarding the color profile, and the manner in which the color profile may be edited. For example, some selective color edit tools allow a user to make selective color edits using L*a*b* slider bars, but provide limited information about the available colors in the color gamut of the output device. For example, a user may desire to increase the a* value of the selected color, but the desired value may not be available at the existing L* and b* values. Although the program may display a cross section of the profile for the given L* value, the program may not display any other information about the output color gamut that would allow the user to select available edited color values.

In addition, although each user may have an individual preference for perceiving color, previously known color profile editing systems typically limit the presentation of color information to the user. For example, one user may be more comfortable visualizing color in terms of hue, lightness and chroma, whereas another user may prefer to work with color in XYZ values. Nevertheless, some previously known color profile editors only display color as L*a*b* values, and thus force all users to work with color values in a single coordinate system. For a user who is not comfortable working in L*a*b* values, the color profile editing program may be less useful and effective.

SUMMARY

This invention provides apparatus and methods for editing color profiles. In particular, exemplary embodiments of apparatus and methods in accordance with this invention receive input data (such as reference image data), convert the input data to first output data using a first color profile and to second output data using a second color profile, wherein the second color profile comprises an edited version of the first color profile, calculate soft proof data corresponding to the input data, first output data and second output data and display the soft proof data corresponding to the input data, first output data and second output data on a display device. The soft proof data corresponding to the input data, first output data and second output data may be simultaneously or selectively displayed on the display device.

In other embodiments, apparatus and methods in accordance with this invention display color data values of the input data, first output data and second output data. In particular, the color data values may be selectively displayed as L*a*b*, XYZ, RGB or CMYK color data values. In still other embodiments, apparatus and methods in accordance with this invention display soft proof color patches having color values that substantially match the color values of the input data, first output data and second output data.

In additional embodiments, apparatus and methods in accordance with this invention receive a user selection of a sample of the input data, calculate corresponding samples of the first output data and second output data and display a soft proof of the sample of the input data and the corresponding samples of the first output data and second output data on the display device. In addition, indicia uniquely associated with the input data, first output data and second output data may be displayed on the display device.

In still other embodiments, apparatus and methods in accordance with this invention calculate a first color difference between the input data and the first output data, and a second color difference between the first output data and the second output data. The first color difference and the second color difference also may be displayed on the display device.

In alternative embodiments, apparatus and methods in accordance with this invention identify a difference between the first output data and the second output data, and modify the second output data to indicate the difference in the soft proof of the second output data. In particular, if the first output data and the second output data each may include multiple pixels, with each pixel including multiple color values, apparatus and methods in accordance with this invention identify second output data pixels having color values that differ from color values of corresponding first output data pixels, and then modify the color values of the identified pixels to emphasize the difference in the soft proof of the second output image data.

BRIEF DESCRIPTION OF THE DRAWINGS

Features of the present invention can be more clearly understood from the following detailed description considered in conjunction with the following drawings, in which the same reference numerals denote the same elements throughout, and in which:

FIG. 10 is a view of a hue leaf of the color gamut of FIG. 9;

DETAILED DESCRIPTION

In the following discussion, numerous specific details are set forth to provide a thorough understanding of apparatus and methods in accordance with this invention. However, persons of ordinary skill in the art will understand that apparatus and methods in accordance with this invention may be practiced without such specific details. In addition, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
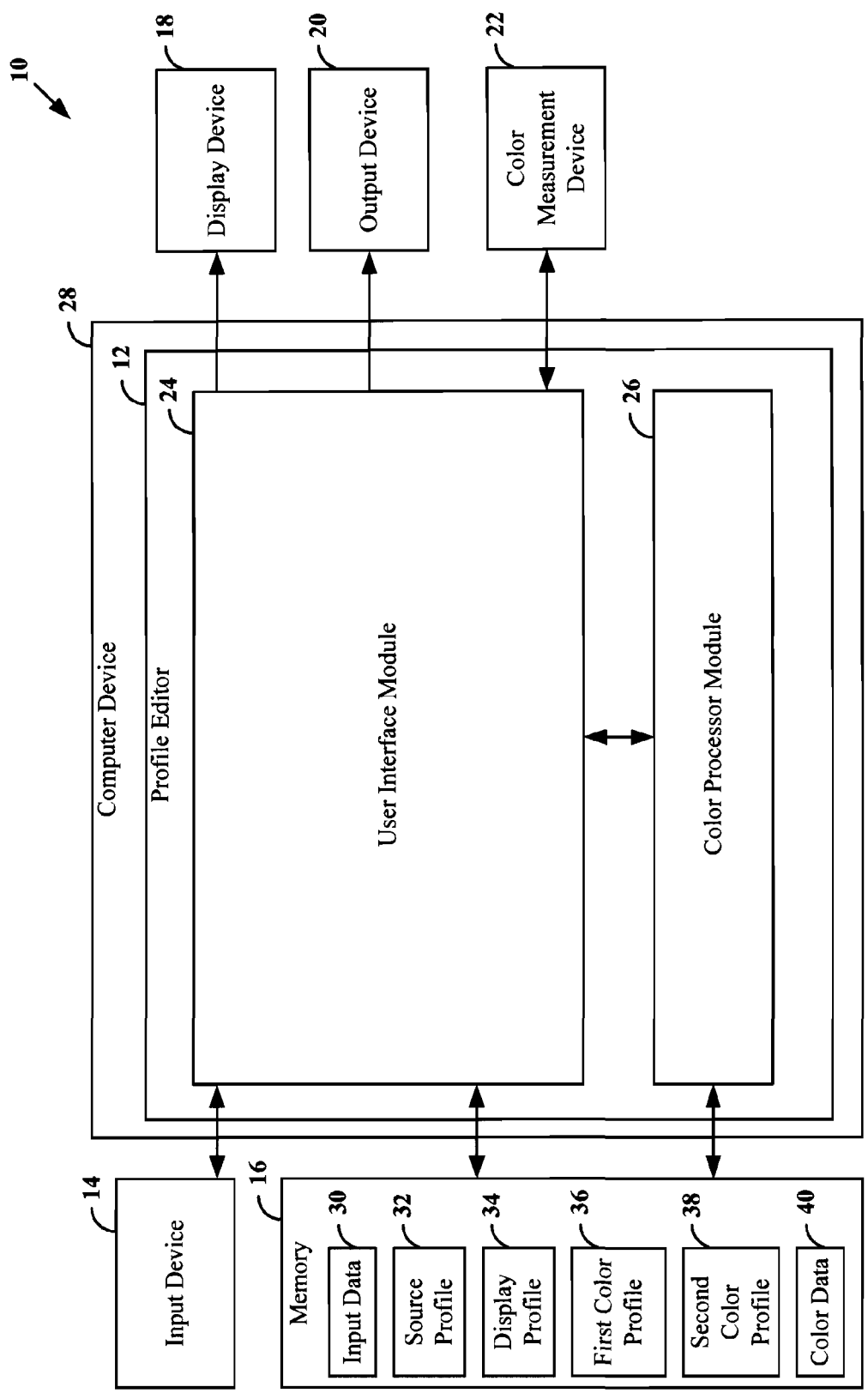
FIG. 1 is an exemplary embodiment of a color profile editor system in accordance with this invention.

Referring to FIG. 1, a first exemplary embodiment of a color profile editor system in accordance with this invention is described. Color profile editor system 10 includes a profile editor 12 coupled to input device 14, memory 16 and display device 18. Profile editor 12 optionally may also be coupled to output device 20 and/or color measurement device 22. Input device 14 may include a keyboard, mouse, optical pointing device, touch pad, and/or other similar input device or combination of such devices. Memory 16 may include a floppy disk, hard disk, optical disk, flash memory device or other similar memory device or combination of such devices. Display device 18 may be a cathode ray tube, liquid crystal display, plasma display or other similar display device or combination of such devices. Output device 20 may be an inkjet printer, laser printer, copier, wide format printer, printing press, display device or other similar output device or combination of such devices. Color measurement device 22 may be a device, such as a calorimeter, spectrophotometer, spectrocolorimeter, or other similar device, that measures and provides spectral and/or colorimetric data describing a printed or displayed sample.

Profile editor 12 may include software and/or hardware that may be used to perform color profile editing in accordance with this invention. In particular, profile editor 12 may include a user interface module 24 coupled to a color processor module 26. User interface module 24 may include hardware and/or software that may be used to receive data from input device 14 and color measurement device 22, read and write data to and from memory 16, and write data to display device 18 and output device 20. Color processor module 26 may include software and/or hardware that may be used to perform color data processing in accordance with this invention. Profile editor 12 may be implemented on a computer device 28, such as a personal computer, laptop computer, handheld computer, mainframe computer, or other similar computer device or combination of such devices. Computer device 28 typically includes an operating system (not shown) that manages the software and hardware resources of the computer device.

Memory 16 may be included in or coupled to computer device 28, and may include input data 30, source profile 32, display profile 34, first color profile 36, second color profile 38 and color data file 40. Input data 30 may be a data file that includes color data describing an input image (e.g., a reference image) that may be used to evaluate the first color profile 36 and second color profile 38. In particular, input data 30 may include a bitmap array of pixels, with each pixel including multiple color values. Input data 30 may be provided by any source of image data, such as a digital camera, color scanner, computer program or computer memory. For example, if input data 30 are scanner data, input data 30 may include pixels expressed as a combination of red, green and blue ("RGB") colorants. Input data 30 may be defined in a device-dependent color space, such as a color space of a digital camera, color scanner or other similar image capture device. Alternatively, input data 30 may be defined in a device-independent color space, such as a CIEXYZ, CIELAB, calibrated RGB, or other similar device-independent color space.

If input data 30 are device-dependent color data, source profile 32 may be a color profile that is used to map color values from the device-dependent color space of input data 30 to color values in the profile connection space. An input profile, such as source profile 32, typically includes only a forward transform. Thus, if input data 30 were produced by an RGB scanner, source profile 32 includes a forward transform that may be used to convert device-dependent RGB color values to equivalent color values in the profile connection space. Persons of ordinary skill in the art will understand that source profile 32 may be linked to or included in input data 30.

Display device 18 and output device 20 typically each have their own unique device-dependent color spaces. Accordingly, display profile 34 and first color profile 36 are color profiles that are used to map color values from the device-dependent color spaces of display device 18 and output device 20, respectively, to color values in the profile connection space. Display profile 34 may be obtained from the color management system (not shown) of computer device 28. First color profile 36 may be provided from the manufacturer of output device 20. Alternatively, first color profile 36 may be obtained by generating a test image on output device 20, measuring the test image using color measurement device 22, and then using color profile generation software (not shown), such as the EFI Color Profile Suite, by Electronics for Imaging, Inc., Foster City, Calif., or other similar profile generation software, to create first color profile 36.

In accordance with this invention, profile editor 12 creates a working copy of first color profile 36 and saves the working copy as second color profile 38. User-defined edits may be made to second color profile 38 to modify the color characteristics of images produced by output device 20. As described in more detail below, profile editor 12 implements a color processing workflow using first color profile 36 and second color profile 38 to generate output data in the device color space of output device 20 (e.g., if output device 20 is a printer, output data are typically expressed as a combination of CMYK colorants). Further, profile editor 12 creates and displays soft proof images of the output of output device 20 using first color profile 36 and second color profile 38.

Figure 2:
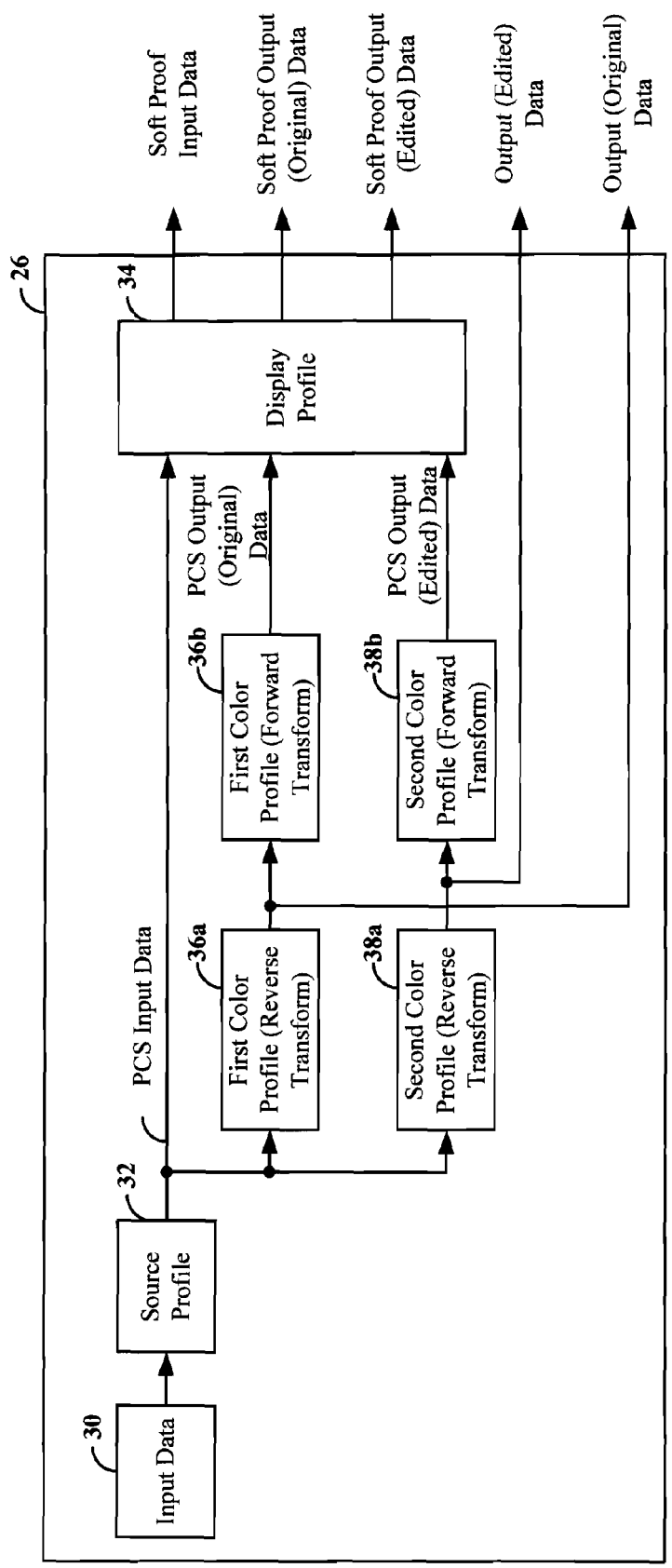
FIG. 2 is an exemplary color processing workflow implemented by color profile editors in accordance with this invention.

In particular, color processor module 26 implements a color processing workflow, an example of which is illustrated in FIG. 2. First, color processor module 26 uses source profile 32 to convert input data 30 to equivalent color values ("PCS Input Data") in the profile connection space. Next, color processor module 26 uses first color profile reverse transform 36*a* and second color profile reverse transform 38*a* to convert PCS Input Data to corresponding first output data ("Output (Original) Data") and second output data ("Output (Edited) Data"), respectively, in the color space of output device 20.

Further, color processor module 26 calculates soft proof data corresponding to input data 30, Output (Original) Data, and Output (Edited) Data. To generate the output soft proof data, color processor module 26 uses first color profile forward transform 36*b* and second color profile forward transform 38*b* to convert Output (Original) Data and Output (Edited) Data, respectively, to corresponding "PCS Output (Original) Data" and "PCS Output (Edited) Data," respectively, in the profile connection space. Then, color processor module 26 uses display profile 32 to convert PCS Input Data, PCS Output (Original) Data and PCS Output (Edited) Data to corresponding "Soft Proof Input Data," "Soft Proof Output (Original) Data" and "Soft Proof Output (Edited) Data," respectively, in the color space of display device 18.

Color processor module 26 may store PCS Input Data, Output (Original) Data, Output (Edited) Data, PCS Output (Original) Data, PCS Output (Edited) Data, Soft Proof Input Data, Soft Proof Output (Original) Data and Soft Proof Output (Edited) Data (collectively referred to herein as "Calculated Color Data") in color data file 40. Further, color processor module 26 may store PCS Input Data, PCS Output (Original) Data and PCS Output (Edited) Data as L*a*b* data and as XYZ data.

User interface module 24 retrieves Soft Proof Input Data, Soft Proof Output (Original) Data and Soft Proof Output (Edited) Data from color data file 40 to display corresponding soft proof images, referred to herein as "Source," "Output (Original)" and "Output (Edited)," respectively, on display device 18. Table 1 summarizes the naming convention used herein to describe the various color data and the corresponding soft proof data and soft proof images:

TABLE 1

| Color Data | Soft Proof Data | Soft Proof Image |
| --- | --- | --- |
| Input Data | Soft Proof Input Data | Source |
| Output (Original) Data | Soft Proof Output (Original) Data | Output (Original) |
| Output (Edited) Data | Soft Proof Output (Edited) Data | Output (Edited) |

Figure 3:
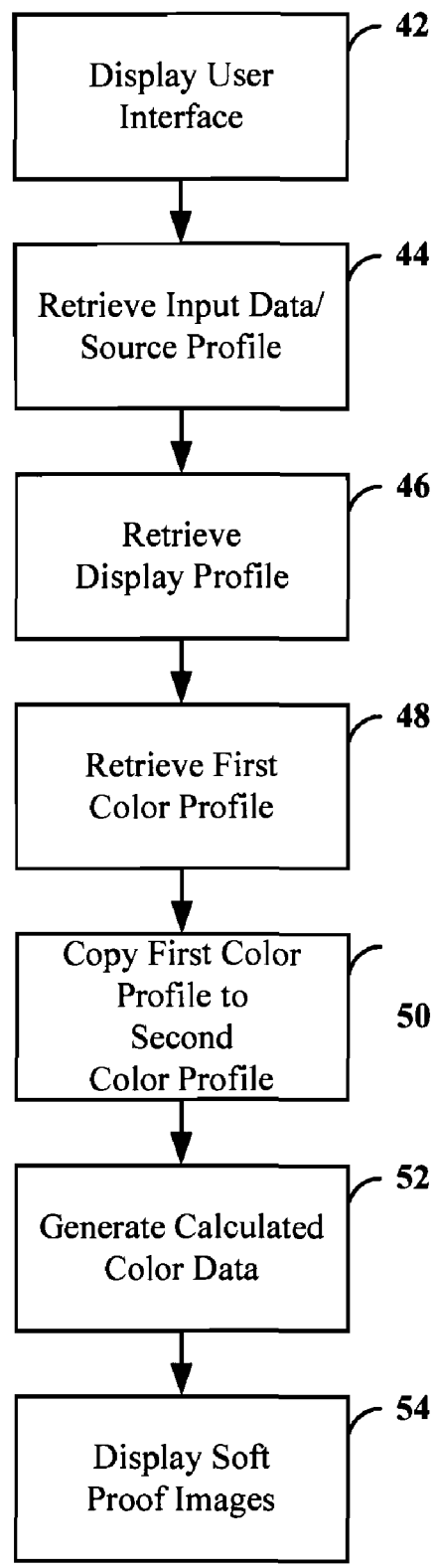
FIG. 3 is an exemplary soft proofing display process implemented by color profile editors in accordance with this invention.

Referring now to FIGS. 1 and 3, an exemplary soft proofing display process implemented by profile editor 12 is described. At step 42, user interface module 24 displays on display device 18 a profile editing user interface, such as the exemplary user interface 70 illustrated in FIG. 4A. Next, at step 44, user interface module 24 retrieves input data 30 and source profile 32. For example, a user may use a "File/Open" option on user interface 70 to select input data 30 from a file folder on the computer device. As previously mentioned, source profile 32 may be linked to or included in input data 30. Thus, when a user selects input data 30, source profile 32 may be automatically selected. Alternatively, a user may use a "File/Open" option on user interface 70 to select source profile 32 from a file folder on computer device 28. Persons of ordinary skill in the art will understand that if input data 30 are device-independent data, the step of selecting source profile 32 may be omitted.

Next, at step 46, user interface module 24 retrieves display profile 34. For example, user interface module 24 may retrieve display profile 34 from the operating system color management system. Alternatively, a user may use a "File/Open" option on user interface 70 to select display profile 34. Next, at step 48, user interface module 24 retrieves first color profile 36. For example, user interface 70 may include a first color profile selection icon 72 that permits a user to select a first color profile 36 to edit. For convenience, a first color profile display section 74 on user interface 70 may display a name associated with first color profile 36.

Next, at step 50, user interface module 24 makes a working copy of first color profile 36, and saves the working copy as second color profile 38. As described in more detail below, all user-defined edits are made in the second color profile 38. Next, at step 52, color processor module 26 implements a color processing workflow, such as the exemplary workflow of FIG. 2, to generate Calculated Color Data. At step 54, user interface module 24 retrieves Soft Proof Input Data, Soft Proof Output (Original) Data and Soft Proof Output (Edited) Data from color data file 40, and displays the corresponding Source, Output (Original) and Output (Edited) soft proof images on display device 18.

Figure 4A:
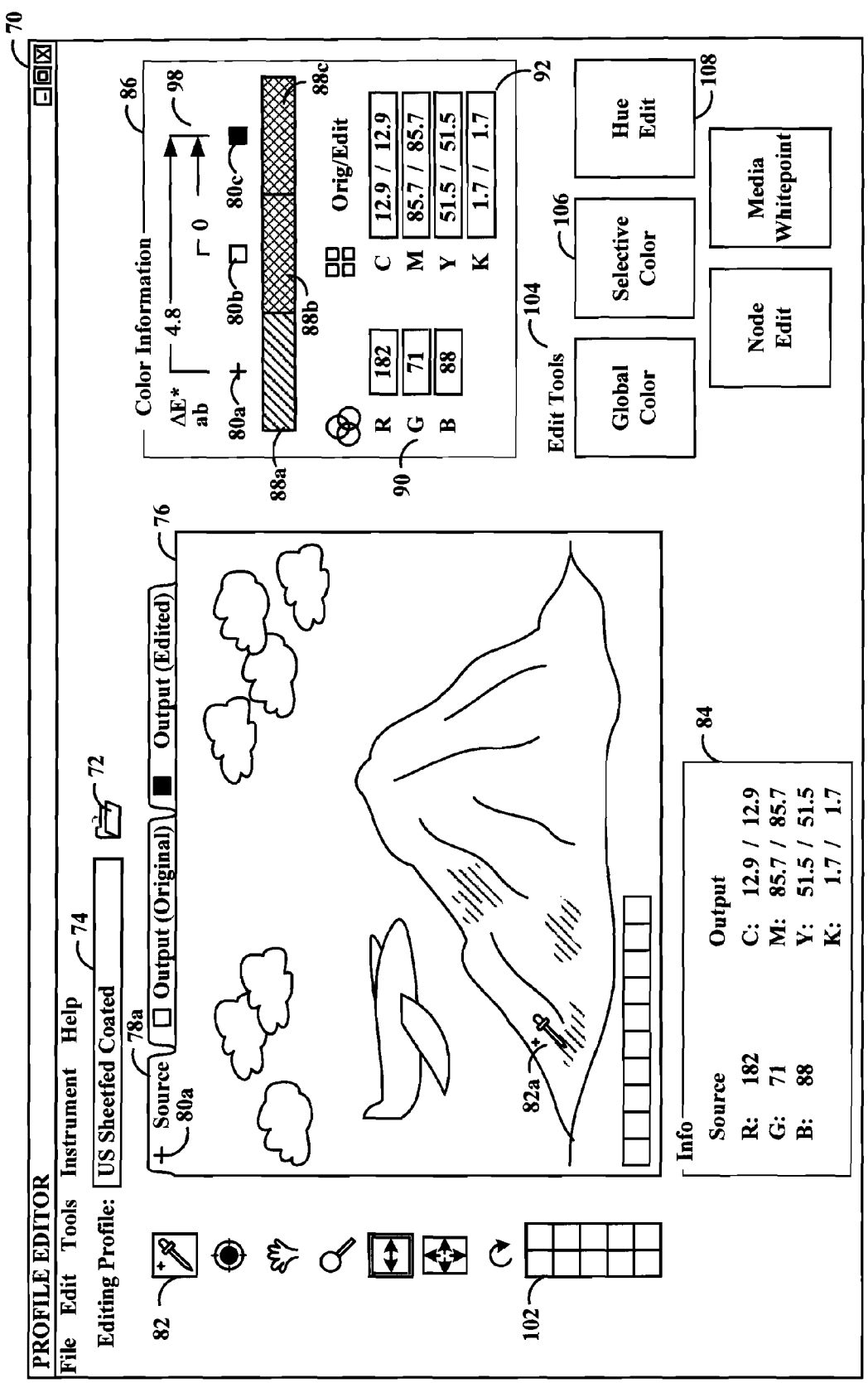
FIGS. 4A and 4C are views of an exemplary user interface of color profile editors in accordance with this invention.
Figure 4B:
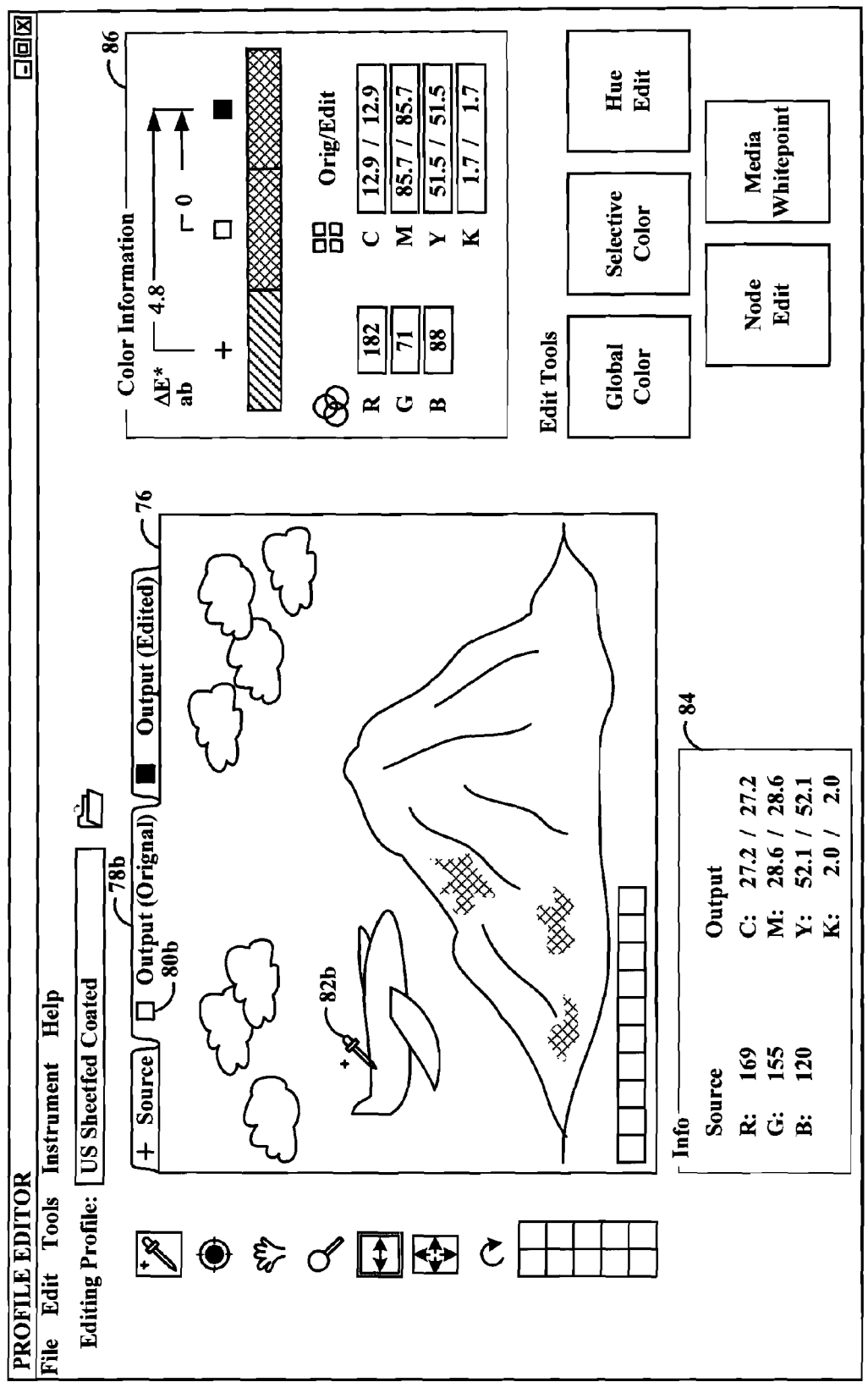
Figure 4C:
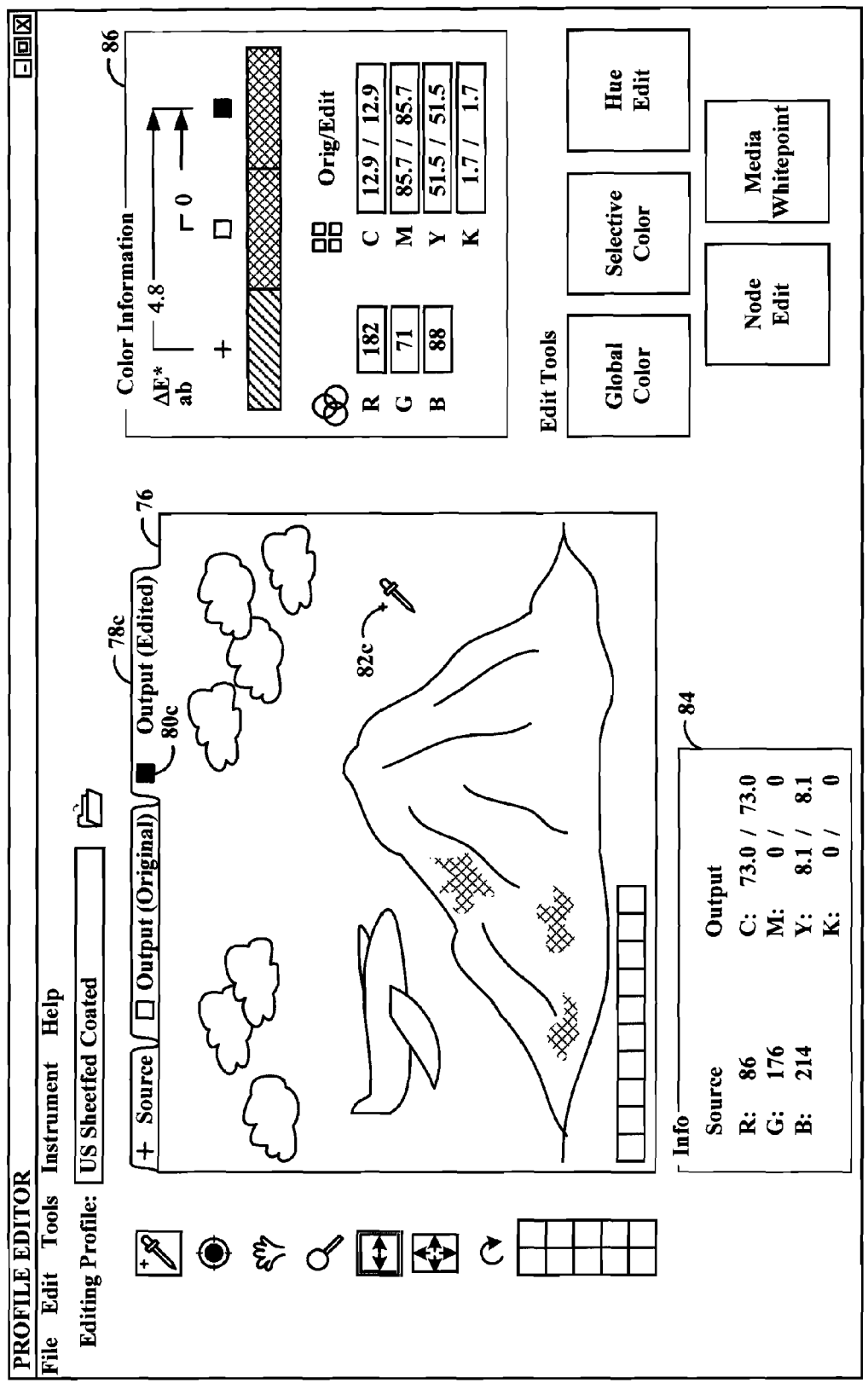

For example, as illustrated in FIGS. 4A-4C, user interface 70 may include image area 76 that displays the Source, Output (Original) and Output (Edited) soft proof images, respectively. The soft proof images may be overlaid on top of one another, and image area 76 may include tabs 78a-78c that may be used to selectively display one of the Source, Output (Original) and Output (Edited) images. Alternatively, image area 76 may display two or more of the soft proof images side-by-side, so that the images are simultaneously viewable. Further, user interface 70 may also include indicia 80a-80c uniquely associated with the Source, Output (Original) and Output (Edited) soft proof images, respectively.

In addition to displaying soft proof images, profile editor 12 also may display color data values corresponding to the soft proof images. Indeed, referring again to FIGS. 1 and 4A-4C, user interface 70 may include a selectable eyedropper tool 82 that may be used to obtain color data values corresponding to the location of the tip of eyedropper tool 82 as a user scans the tool across image area 76. In particular, user interface module 24 determines the pixel location of the tip of eyedropper tool 82 on image area 76, and then retrieves the corresponding input values from input data 30, and the corresponding Output (Original) Data and Output (Edited) Data values from color data file 40. User interface module 24 then displays the retrieved color data values in a dynamic color information display area 84 of user interface 70.

For example, as illustrated in FIG. 4A, the tip of eyedropper 82a is located over a Source image pixel that has corresponding RGB input data 30 values (182, 71, 88). The counterpart Output (Original) image pixel has corresponding CMYK Output (Original) Data values (12.9, 85.7, 51.5, 1.7). Because no edits have yet been made to first color profile 36, the counterpart Output (Edited) image pixel also has corresponding CMYK Output (Edited) Data values (12.9, 85.7, 51.5, 1.7). In contrast, as illustrated in FIG. 4B, the tip of eyedropper 82b is located over a Source image pixel that has corresponding RGB input data 30 values (169, 155, 120). Counterpart Output (Original) and Output (Edited) image pixels have corresponding CMYK Output (Original) Data and Output (Edited) Data values (27.2, 28.6, 52.1, 2.0). Further, as illustrated in FIG. 4C, the tip of eyedropper 82c is located over a Source image pixel that has corresponding RGB input data 30 values (86, 176, 214). Counterpart Output (Original) and Output (Edited) image pixels have corresponding CMYK Output (Original) Data and Output (Edited) Data values (73.0, 0, 8.1, 0).

In addition, if a user selects a pixel on the Source, Output (Original) or Output (Edited) images (e.g., by locating the tip of eyedropper 82a over a desired position on one of the images and then left clicking a mouse button), user interface module 24 displays more information about the input data 30, Output (Original) Data and Output (Edited) Data values corresponding to the selected pixel. For simplicity, the input data 30, Output (Original) Data and Output (Edited) Data values corresponding to the selected pixel will be referred to herein as the "Selected Input Color," "Selected Output Color" and "Selected Edited Output Color," respectively.

For example, user interface 70 may include a selected color information area 86 that includes soft proof color patches 88a-88c corresponding to the Selected Input Color, Selected Output Color and Selected Edited Output Color, respectively. In particular, user interface module 24 retrieves from color data file 40 the Soft Proof Input Data, Soft Proof Output (Original) Data and Soft Proof Output (Edited) Data that correspond to Selected Input Color, Selected Output Color and Selected Edited Output Color, and then displays corresponding soft proof color patches 88a-88c on display device 18 based on the determined soft proof data. Further, indicia 80a-80c associated with the Source, Output (Original) and Output (Edited) soft proof images, respectively, may be displayed adjacent soft proof color patches 88a-88c, respectively.

Selected color information area 86 also may include source color data value display area 90 and output color data value display area 92 that may be used to display color data values of the Selected Input Color, Selected Output Color and Selected Edited Output Color. As shown in FIGS. 4A-4C, source color data value display area 90 and output color data value display area 92 may display device-dependent color data values (i.e., color data values in the input data 30 color space and output device 20 color space).

Figure 5A:
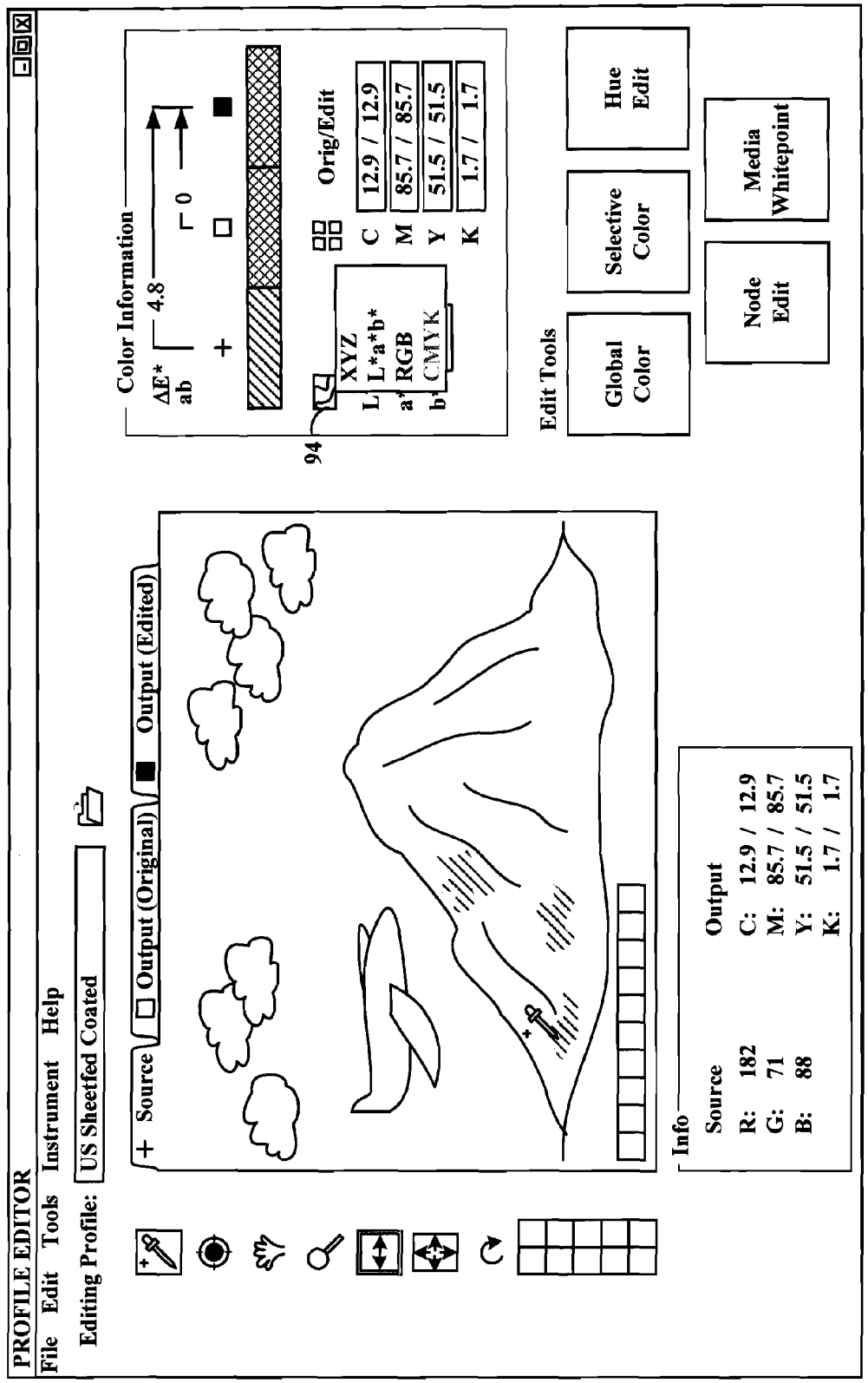
FIGS. 5A-5C are additional views of exemplary user interfaces of color profile editors in accordance with this invention.
Figure 5B:
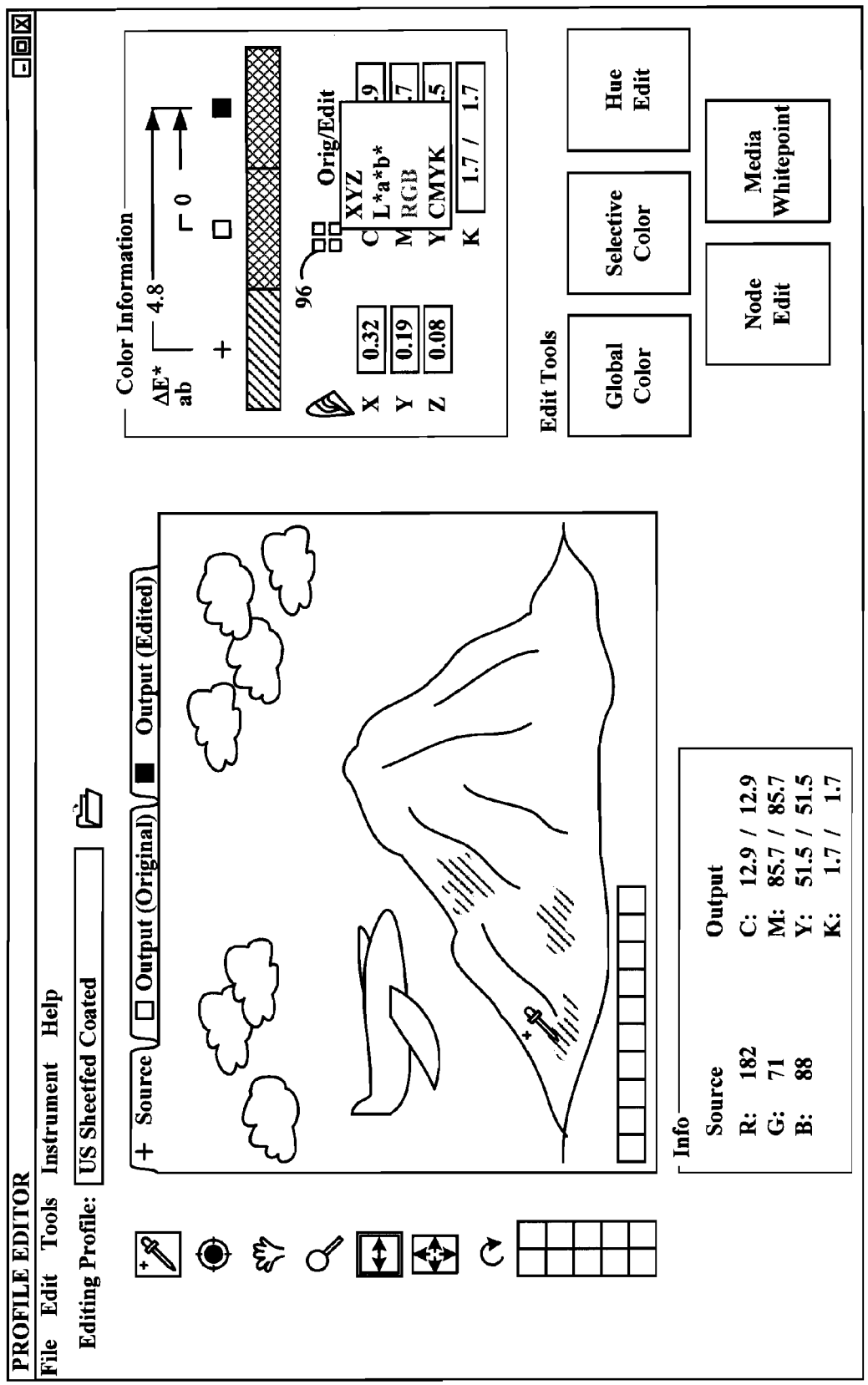

Additionally, as shown in FIGS. 5A and 5B, source color data value display area 90 and output color data value display area 92 may include color space selection icons 94 and 96, respectively, that may be used to select the color space that is used to display color data values in source color data value display area 90 and output color data value display area 92, respectively. Thus, as shown in FIG. 5A, if input data 30 includes RGB color data values, color space selection icon 94 may be used to selectively display source color data values as RGB, XYZ or L*a*b* color data values. For example, if a user selects RGB color data values using color space selection icon 94, source color data value display area 90 will display the Selected Input Color values. Alternatively, if the user selects XYZ (or L*a*b*) color data values using color space selection icon 94, source color data value display area 90 will display XYZ (or L*a*b*) PCS Input Data values corresponding to the Selected Input Color.

Figure 5C:
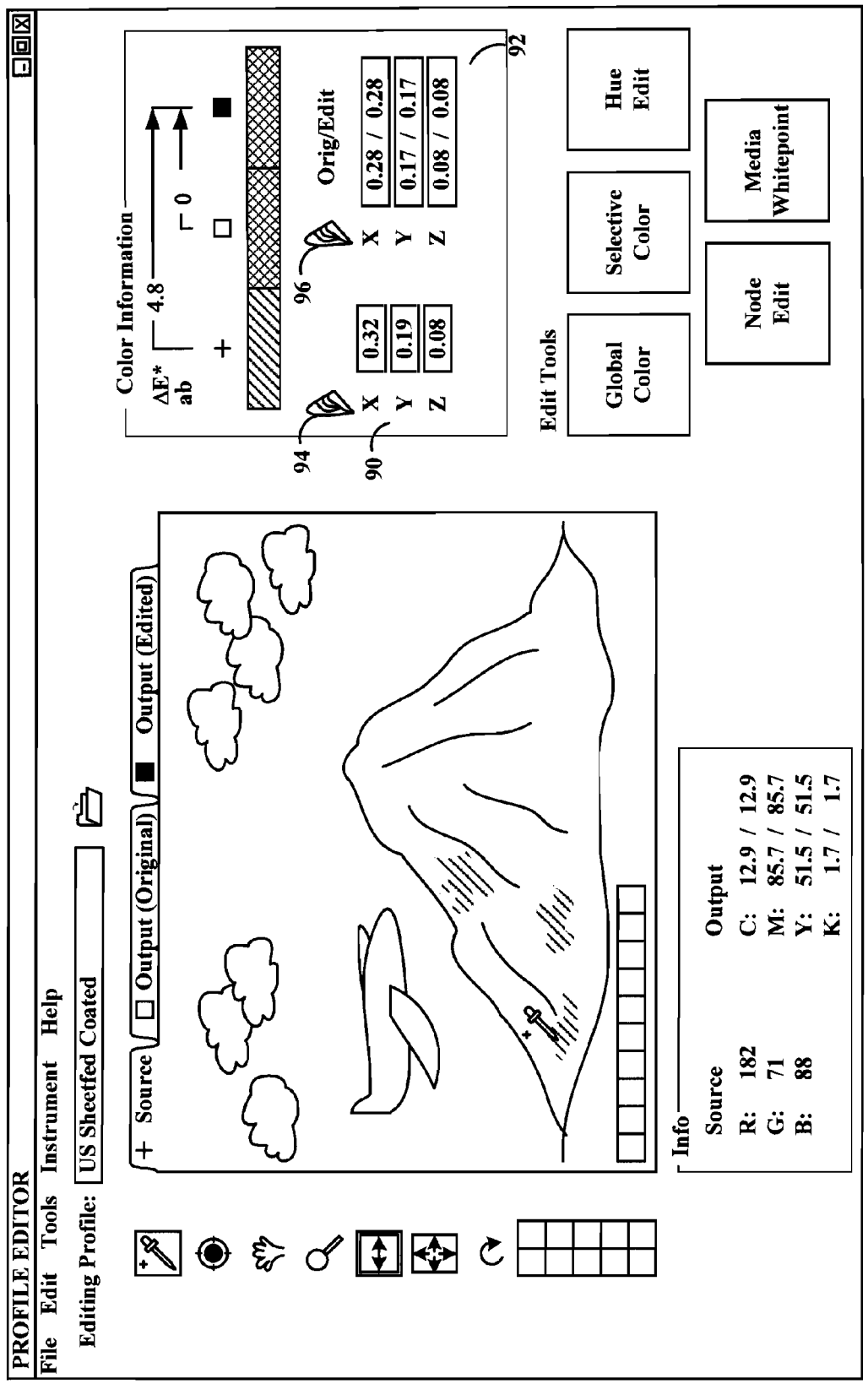

Similarly, as shown in FIG. 5B, if output device 20 is a CMYK output device, color space selection icon 96 may be used to selectively display output color data values as CMYK, XYZ or L*a*b* or color data values. For example, if a user selects CMYK color data values using color space selection icon 96, output color data value display area 92 will display the Selected Output Color and Selected Edited Output. Alternatively, if the user selects XYZ (or L*a*b*) color data values using color space selection icon 96, output color data value display area 92 will display XYZ (or L*a*b*) PCS Output (Original) Data and PCS Output (Edited) Data values corresponding to the Selected Output Color and Selected Edited Output Color, respectively. FIG. 5C illustrates color space selection icons 94 and 96 set so that source color data value display area 90 and output color data value display area 92 both display XYZ color data values.

Figure 6:
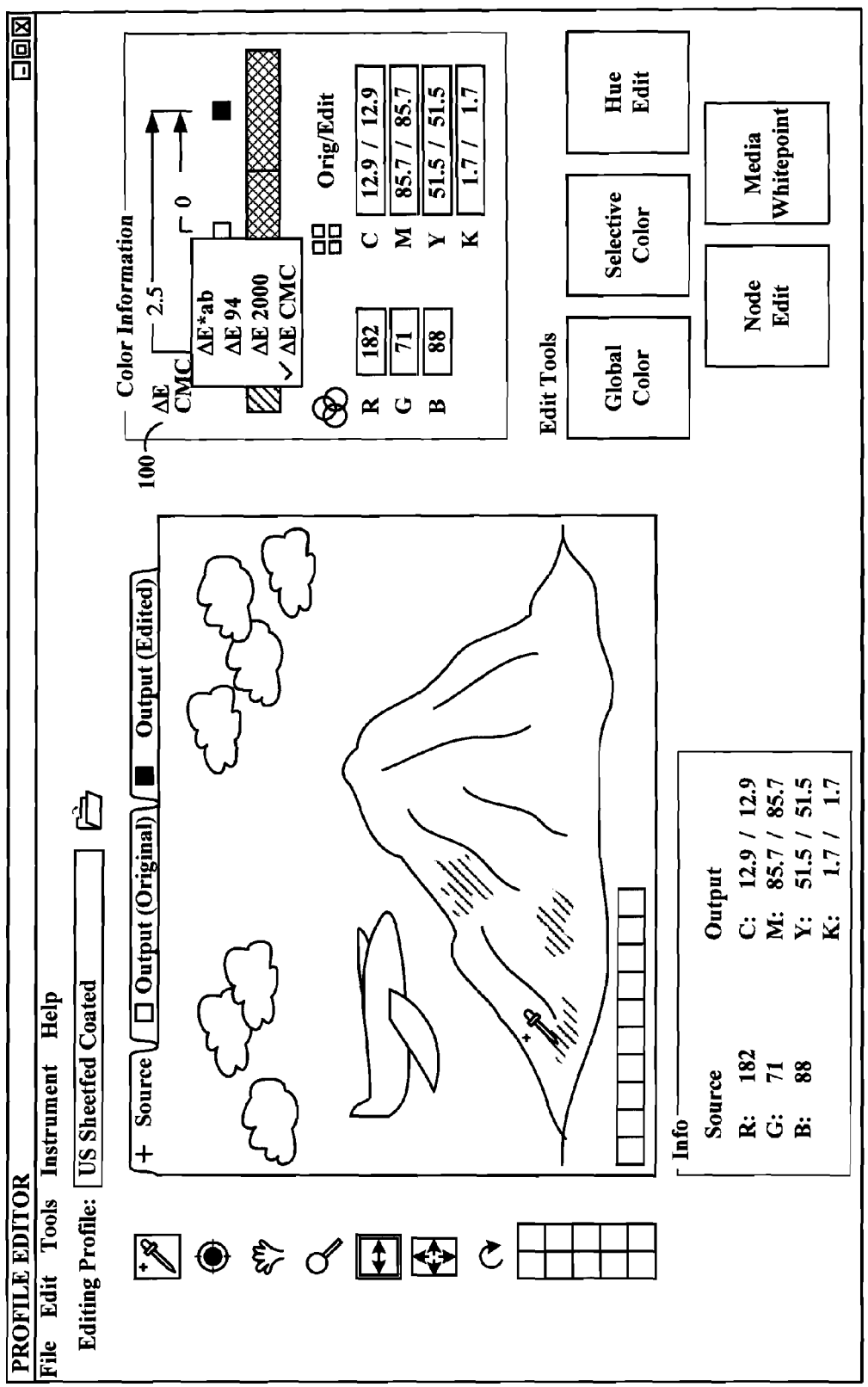
FIG. 6 is another view of an exemplary user interface of color profile editors in accordance with this invention.

Referring again to FIG. 4A, user interface 70 also may include color difference image area 98 that displays color differences between the Selected Input Color and the Selected Edited Output Color, and between the Selected Output Color and Selected Edited Output Color. In particular, color processor module 26 may calculate color difference values using the corresponding PCS Input Data, PCS Output (Edited) Data and PCS Output (Original) Data values, and user interface module 24 may then display the calculated values in color difference image area 98. As shown in FIG. 6, color difference image area 98 may include a color difference selection icon 100 that may be used to select the formula used to calculate color difference values. In the illustrated example, color difference selection icon 100 may be used to selectively display $\Delta E^*ab$, $\Delta E\,94$, $\Delta E\,2000$ and $\Delta E$ CMC color difference values. Persons of ordinary skill in the art will understand that color difference selection icon 100 alternatively may be used to display color difference values calculated using formulas other than those illustrated in FIG. 6.

Referring again to FIG. 4A, user interface 70 also may include "memory color" area 102 that may include one or more color patches having color data values (referred to herein as "Memory Data values") for commonly perceived colors, such as skin tones, sky, vegetation, earth tones and other similar "memory colors." Selectable eyedropper tool 82 may be used to select any of these memory colors, and color processor module 26 processes the Memory Data values using first color profile 36 and second color profile 38 to generate Output (Original) Data, Output (Edited) Data, PCS Output (Original) Data, PCS Output (Edited) Data, Soft Proof Input Data, Soft Proof Output (Original) Data and Soft Proof Output (Edited) Data, as in the exemplary process described above in connection with FIG. 2. Thus, even if input data 30 does not include one or more memory colors, a user may select a color from memory color area 102 to evaluate and edit second color profile 38 using such memory colors.

A color profile, such as second color profile 38, generally includes multiple lookup tables that may be used to convert color values between a first color system (e.g., the profile connection space) and a second color system (e.g., the color space of output device 20). For example, a "reverse" table in second color profile 38 includes second color values (e.g., CMYK color values in the color space of output device 20) and corresponding first color values (e.g., color values in the profile connection space). To change a particular color printed by output device 20 (e.g., the Selected Edited Output Color), a user therefore may identify the second color values in the reverse table of second color profile 38 corresponding to the Selected Edited Output Color (referred to herein as the "Selected Second Color Values"), and then modify the Selected Second Color Values to effect the desired change.

User interface 70 may include edit tools area 104 that provides tools that allow a user to indirectly or directly perform such edits in second color profile 38. In particular, edit tools area 104 may include a selective color edit tool 106 and a hue edit tool 108. As described in more detail below, selective color edit tool 106 provides various tools that allow a user to indirectly or directly modify individual Selected Second Color Values. Further, hue edit tool 108 provides various tools that allow a user to indirectly modify all second color values in the reverse table of second color profile 38 that have the same hue as the Selected Edited Output Color. As a user modifies second color values in second color profile 38, color processor module 26 recalculates Output (Edited) Data, PCS Output (Edited) Data and Soft Proof Output (Edited) Data, and user interface module 24 correspondingly modifies Output (Edited) image, soft proof color patch 88c, output color data value display area 92 and color difference image area 98.

Figure 7A:
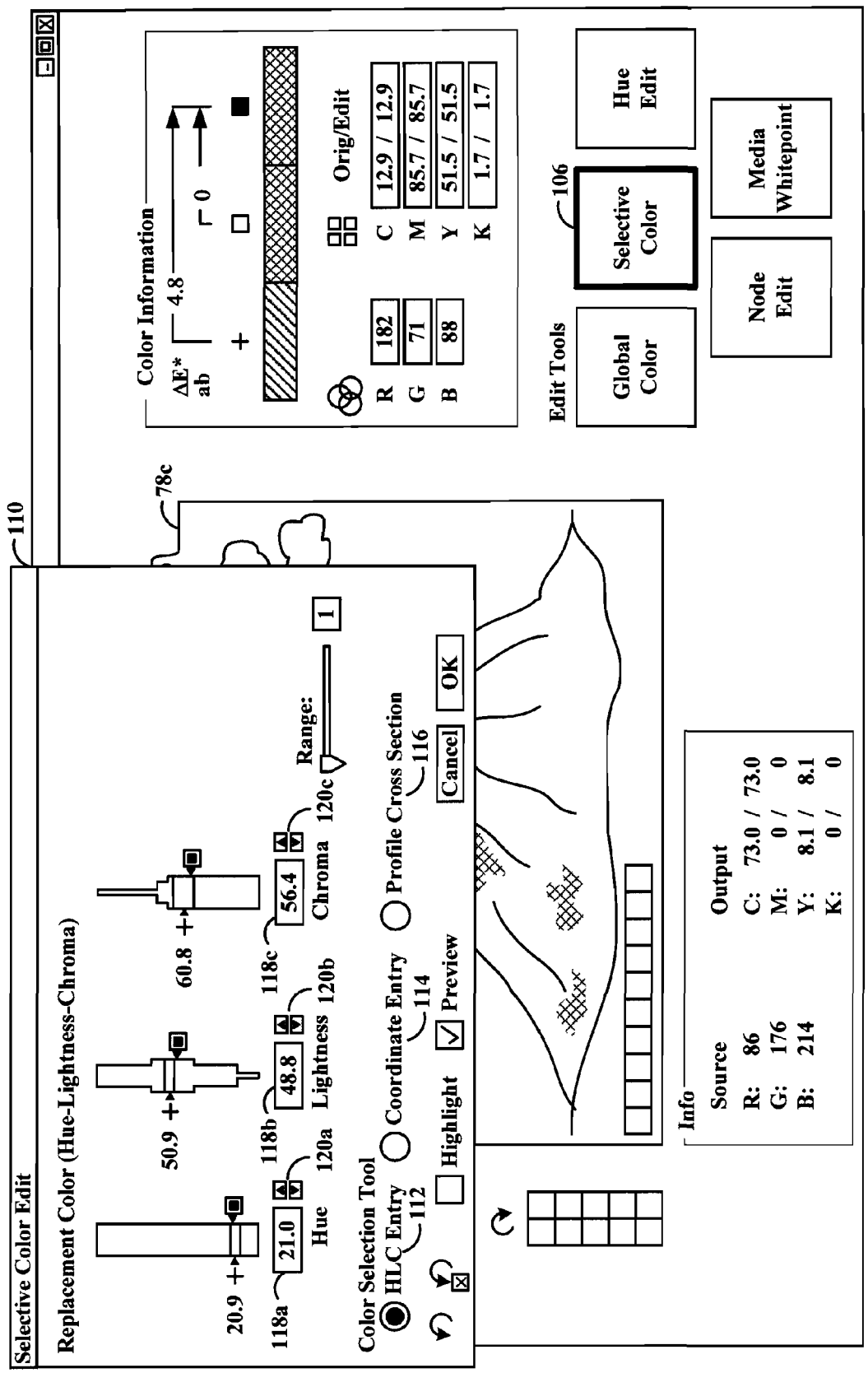
FIGS. 7A-7E are views of an exemplary selective color edit interface of color profile editors in accordance with this invention.

If a user clicks on selective color edit tool 106, user interface module 24 displays a selective color edit window in user interface 70. Referring now to FIG. 7A, an exemplary selective color edit window 110 is described. Exemplary selective color edit window 110 includes radio buttons 112-116 that may be used to select various views for displaying and modifying Selected Second Color Values. In particular, radio buttons 112-116 may include "HLC Entry," "Coordinate Entry," and "Profile Cross Section" selections, respectively, which will be described in more detail below.

If a user selects HLC radio button 112, color processor module 26 calculates the hue, lightness and chroma of the Selected Input Color, Selected Output Color and Selected Edited Output Color, and selective color edit window 110 displays a "Replacement Color (Hue-Lightness-Chroma)" view, which includes data windows 118a-118c that display the calculated hue, lightness and chroma values, respectively, of the Selected Edited Output Color. In addition, selective color edit window 110 displays control arrows 120a-120c that may be used to modify the hue, lightness and chroma values, respectively, of the Selected Edited Output Color. As a user changes any of these values, color processor module 26 calculates modified Selected Second Color Values corresponding to the modified Selected Edited Output Color, and then replaces the Selected Second Color Values with the modified Selected Second Color Values.

Figure 7B:
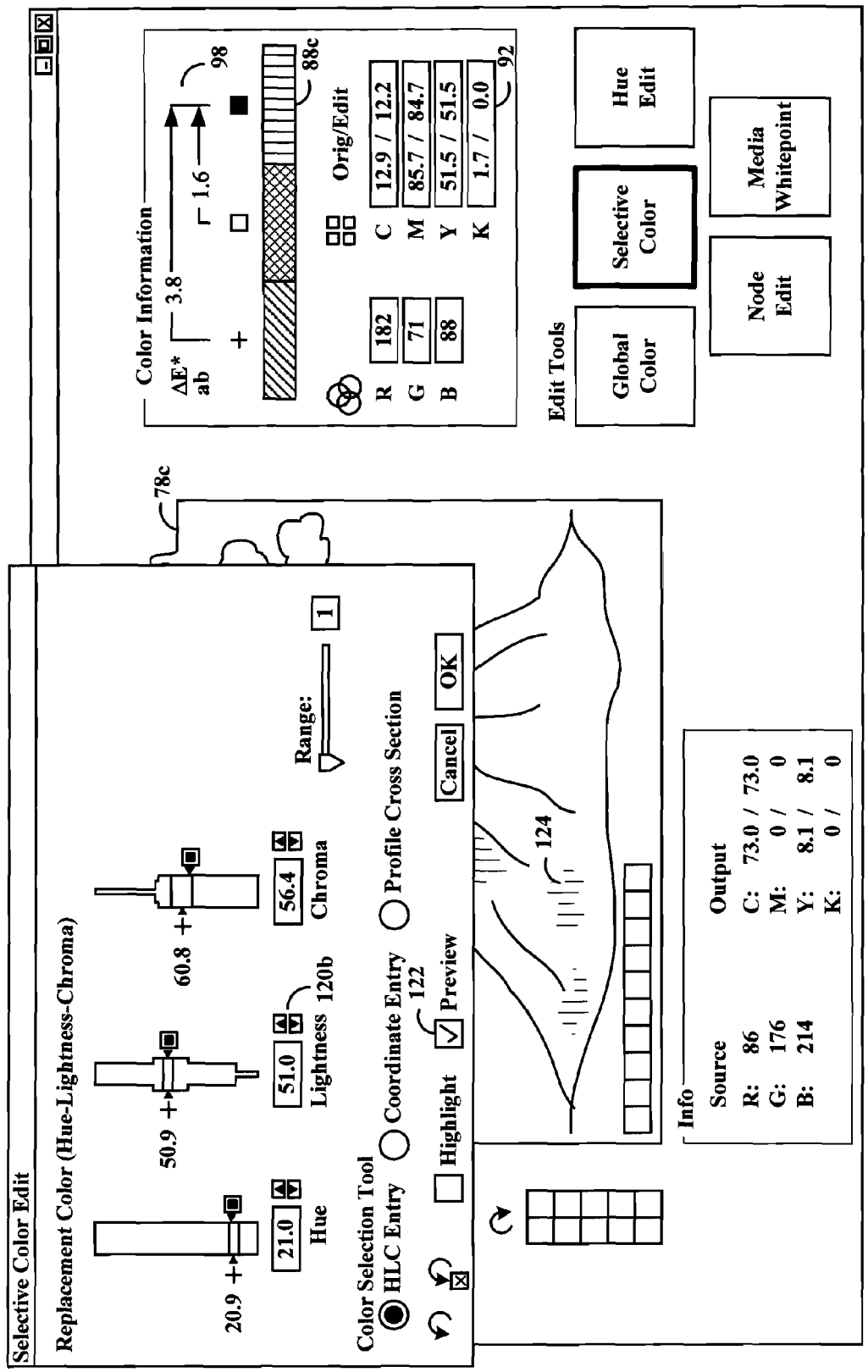

For example, as shown in FIG. 7B, a user may click on up arrow 120b to increase the lightness of the Selected Edited Output Color from 48.8 to 51.0. Color processor module 26 then calculates modified Selected Second Color Values corresponding to the modified Selected Edited Output Color, and then replaces the Selected Second Color Values with the modified Selected Second Color Values. In addition, color processor module 26 recalculates Output (Edited) Data, PCS Output (Edited) Data and Soft Proof Output (Edited) Data, and user interface module 24 correspondingly modifies soft proof color patch 88c, output color data value display area 92 and color difference image area 98 to reflect the modified Selected Second Color Values. Also, if preview checkbox 122 is selected, Output (Edited) image 78c displays a preview of the modified Selected Edited Output Color 124 in the Output (Edited) soft proof image.

Figure 7C:
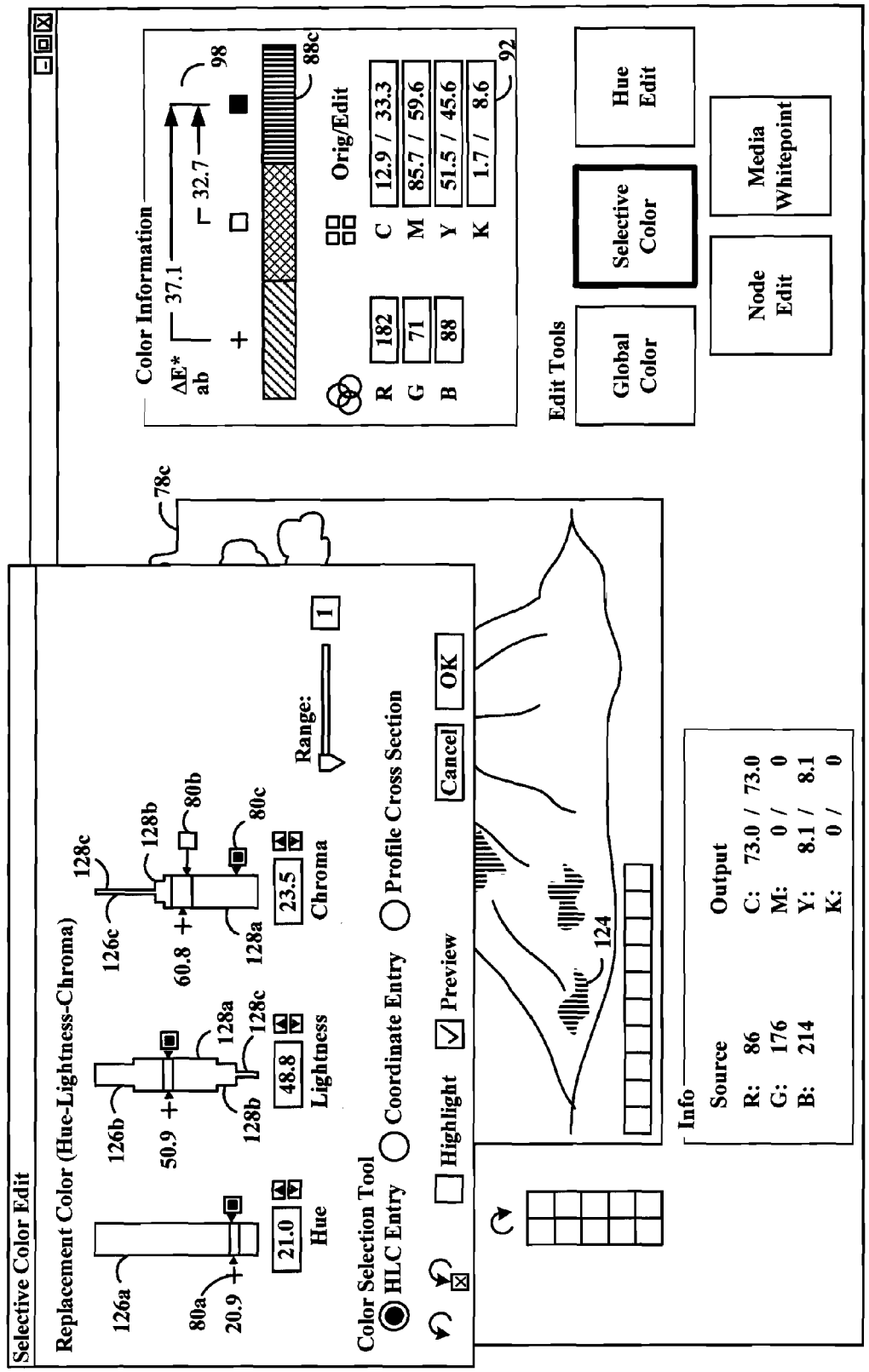

Further, referring now to FIG. 7C, dynamic slider bars 126a-126c display information about the hue, lightness and chroma, respectively, of the Selected Input Color, Selected Output Color and Selected Edited Output colors. Dynamic slider bars 126a-126c each include indicia 80a-80c to indicate the Selected Input Color, Selected Output Color and Selected Edited Output Color, respectively, and also numerically display the hue, lightness and chroma of the Selected Input Color. A user may modify the hue, lightness and chroma of the Selected Edited Output Color by dragging indicia 80c on the corresponding slider bars 126a, 126b and 126c, respectively.

Thus, FIG. 7C illustrates indicia 80c on slider bar 126 dragged down to change the chroma of the Selected Edited Output Color to 23.5. As in the previous example, as a user modifies the Selected Edited Output Color, color processor module 26 calculates modified Selected Second Color Values corresponding to the modified Selected Edited Output Color, replaces the Selected Second Color Values with the modified Selected Second Color Values, and then recalculates Output (Edited) Data, PCS Output (Edited) Data and Soft Proof Output (Edited) Data. Further, user interface module 24 correspondingly modifies soft proof color patch 88*c*, output color data value display area 92 and color difference image area 98 to reflect the modified Selected Second Color Values.

In addition to allowing a user to change the hue, lightness and chroma of the Selected Edited Output Color, dynamic slider bars 126*a*-126*c* also convey information regarding available color values in the color gamut of output device 20. In particular, lightness and chroma slider bars 126*b* and 126*c* may be divided into multiple segments, with the width of the segments varying to indicate whether each value in each range is in the color gamut of the output device. A full width segment 128*a* indicates a color that is in gamut at the current value of lightness and chroma. A narrow segment 128*b* indicates a color that is in gamut, but at a different value of chroma (or lightness). A line segment 128*c* indicates a color that is out of gamut (i.e., unavailable at any value of lightness or chroma. Persons of ordinary skill in the art will understand that other techniques may be used to distinguish in gamut from out of gamut colors on dynamic slider bars 126*b* and 126*c*. For example, lightness and chroma slider bars 126*b* and 126*c* may be divided into multiple segments, with the segment colors varying to indicate whether each value in each range is in the color gamut of the output device.

In this regard, if a user would like to change the chroma of the Selected Edited Output Color to a value in segment 128*b* of chroma slider bar 126*c*, the user may visually deduce that a color at such a chroma value is in gamut, but at a different lightness. Likewise, if the user would like to change the lightness of the Selected Edited Output Color to a value in segment 128*b* of lightness slider bar 126*b*, the user may visually deduce that a color at such a lightness value is in gamut, but at a different chroma. Further, if the user would like to change the lightness of the Selected Edited Output Color to a value in segment 128*c* of lightness slider bar 126*b*, the user may visually deduce that no color at such a lightness value is in gamut at any chroma. Moreover, as a user changes any of the hue, lightness or chroma of Selected Edited Output Color, the widths (or colors) of slider bars 126*b* and 126*c* dynamically adjust to reflect the change. In this regard, the user is continually apprised of the available color values in the color gamut of output device 20.

Figure 7D:
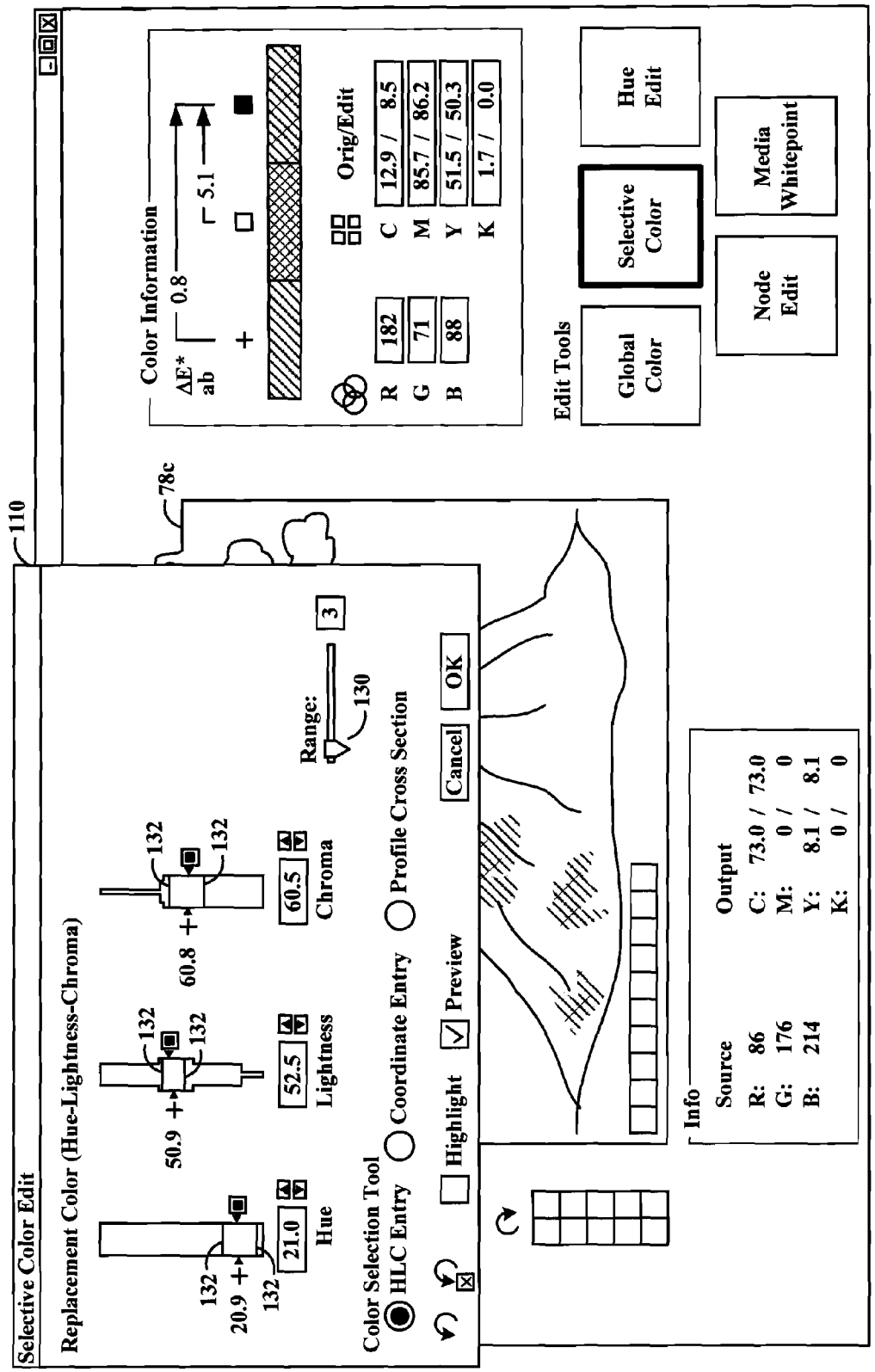

Referring now to FIG. 7D, selective color edit window 110 also may include range selector 130 that may be used to change the range of second color values affected by the user edits. For example, for a range of one (1), the user edits may affect a minimum number of second color values in the second color profile 38. In contrast, for a range greater than one (1), the user edits may affect a larger number of second color values in the second color profile 38. Persons of ordinary skill in the art will understand that any technique for determining the number of affected second color values corresponding to a given range value may be used. Dynamic slider bars 126*a*-126*c* may include range markers 132 to illustrate the extent of hue, lightness and chroma values affected by the range specified by range selector 130.

Figure 7E:
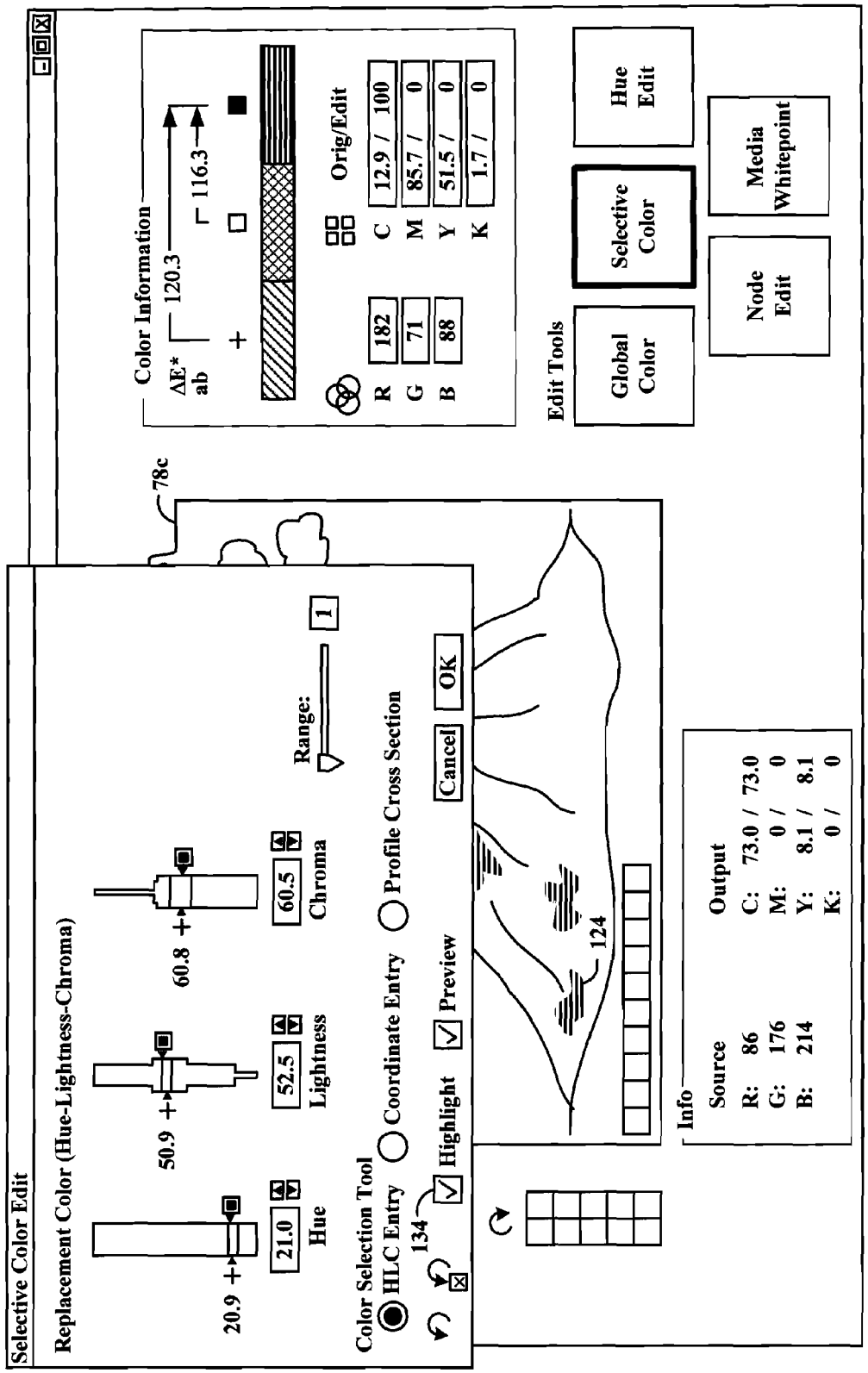

Referring now to FIG. 7E, selective color edit window 110 also may include highlight selection check box 134 that may be used to highlight the Selected Edited Output Color in the Output (Edited) image. That is, if highlight selection check box 134 is checked, profile editor 12 modifies the Soft Proof Output (Edited) data values corresponding to the Selected Edited Output Color to highlight the portion of the Output (Edited) image being affected be the changes to second color profile 38. For example, if the Selected Edited Output Color has color data values whose maximum component is magenta, profile editor 12 may modify the Soft Proof Output (Edited) data values corresponding to the Selected Edited Output Color to have a maximum component of cyan (e.g., C=100, M=Y=K=0). In this regard, this may increase the contrast between the modified Selected Edited Output Color 124 in the Output (Edited) image, and surrounding portions of the Output (Edited) image.

Figure 8:
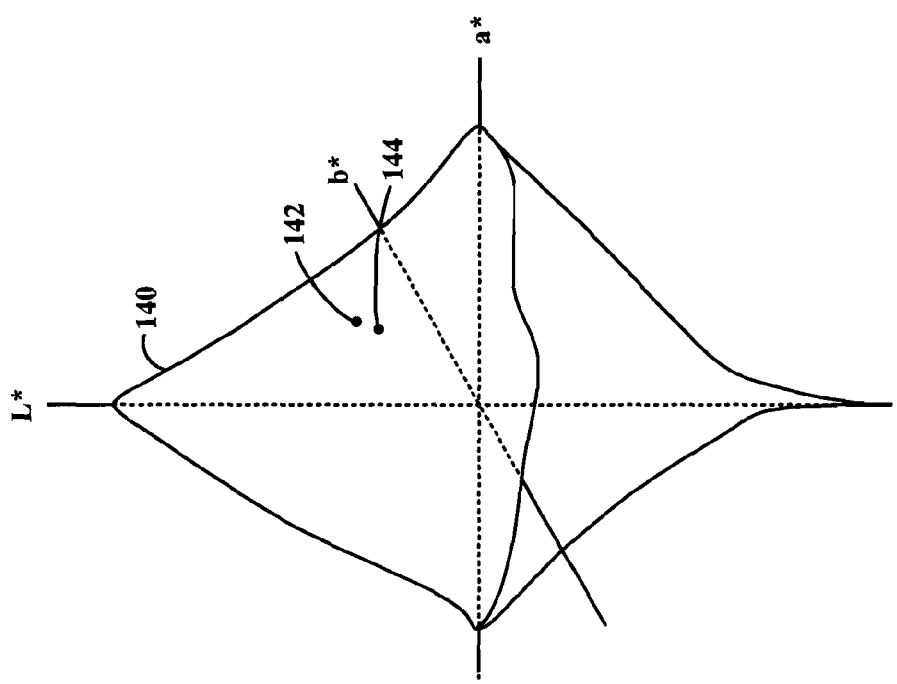
FIG. 8 is a view of an exemplary printer color gamut for use with color profile editors in accordance with this invention.

Although HLC entry tool 112 allows a user to display information about and modify the Selected Edited Output Color using data windows 118*a*-118*c*, control arrows 120*a*-120*c* and dynamic slider bars 126*a*-126*c*, some users may prefer to view and modify the Selected Edited Output Color in relation to other colors in the color gamut of output device 20. Referring now to FIG. 8, a depiction of an exemplary color gamut of output device 20 is described. In particular, exemplary color gamut 140 includes color values in an L*a*b* device-independent color space. Persons of ordinary skill in the art will understand that color gamut 140 alternatively could be displayed in an XYZ device-independent color space, or any other color space. To be displayed or printed by output device 20, color values in second color profile 38, such as Selected Edited Output Color 142 and modified Selected Edited Output Color 144, must lie within the boundaries of color gamut 140. In accordance with this invention, profile editor 12 allows a user to display portions of the color gamut of output device 20, and to graphically modify Selected Edited Output Color 142 in the displayed portion.

Figure 9:
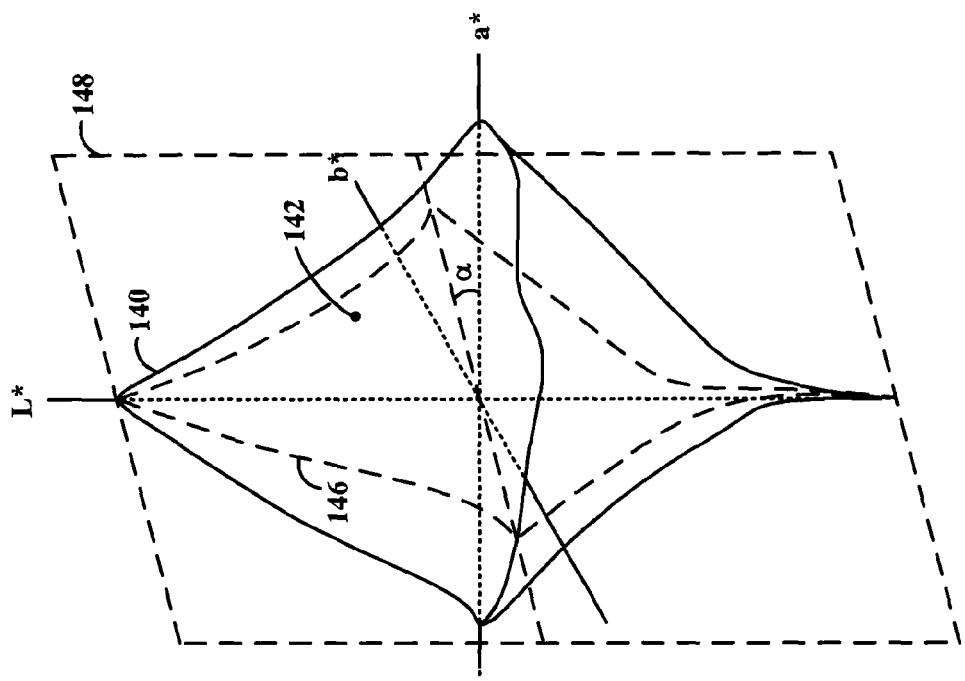
FIG. 9 is another view of the color gamut of FIG. 8.

In particular, profile editor 12 allows a user to graphically modify Selected Edited Output Color 142 on a constant hue plane. FIG. 9 illustrates exemplary color gamut 140, including a hue leaf 146 along hue plane 148. FIG. 10 illustrates a two-dimensional view of hue leaf 146, which has a hue leaf first half portion 146*a* and a hue leaf second half portion 146*b*. Hue leaf first half portion 146*a* includes all colors in color gamut 140 that have hue $\alpha$, with lightness values from 0 to 100, and chroma values represented by the radial distance R from the L* axis. Hue leaf second half portion 146*b* includes all colors in color gamut 140 that have hue ($\alpha$+180°), with lightness values from 0 to 100, and chroma values represented by the radial distance R from the L* axis. In accordance with this invention, profile editor 12 allows the user to modify Selected Edited Output Color 142 by graphically editing colors on hue leaf 146.

Figure 11A:
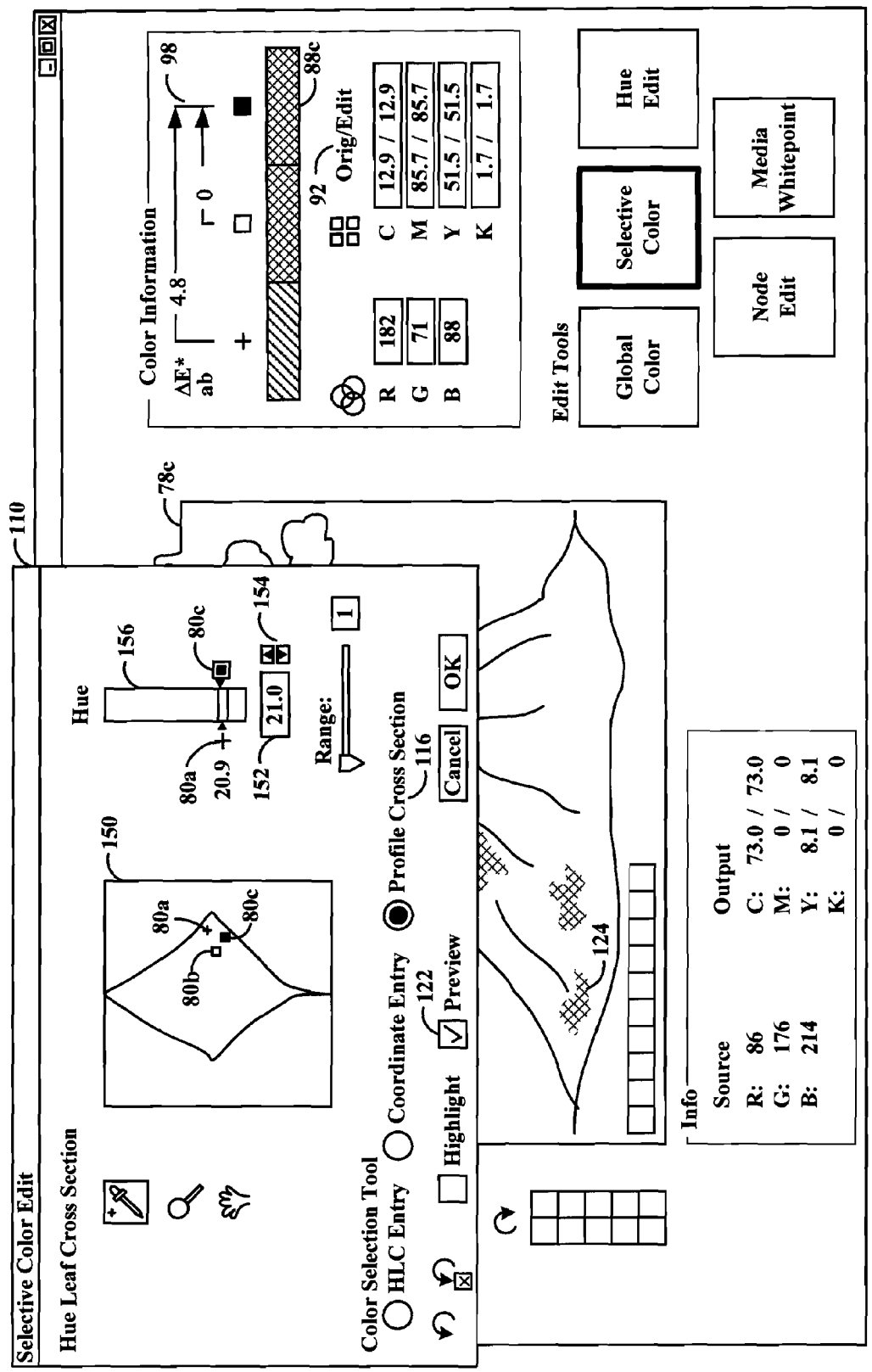
FIGS. 11A-11D are views of an exemplary hue leaf cross section edit user interface of color profile editors in accordance with this invention.

Referring now to FIG. 11A, an exemplary hue leaf display view of selective color edit window 110 is described. In particular, if a user selects Profile Cross Section radio button 116, selective color edit window 110 displays a "Hue Leaf Cross Section" view, which includes hue leaf display window 150, data window 152, control arrows 154 and slider bar 156 for displaying and changing the hue, lightness and chroma values of the Selected Edited Output Color. Slider bar 156 and hue leaf display window 150 each include indicia 80*a*-80*c* to indicate the Selected Input Color, Selected Output Color and Selected Edited Output Color, respectively. In addition, slider bar 156 numerically displays the Selected Input Color hue, and data window 152 displays the Selected Edited Output Color hue.

Figure 11B:
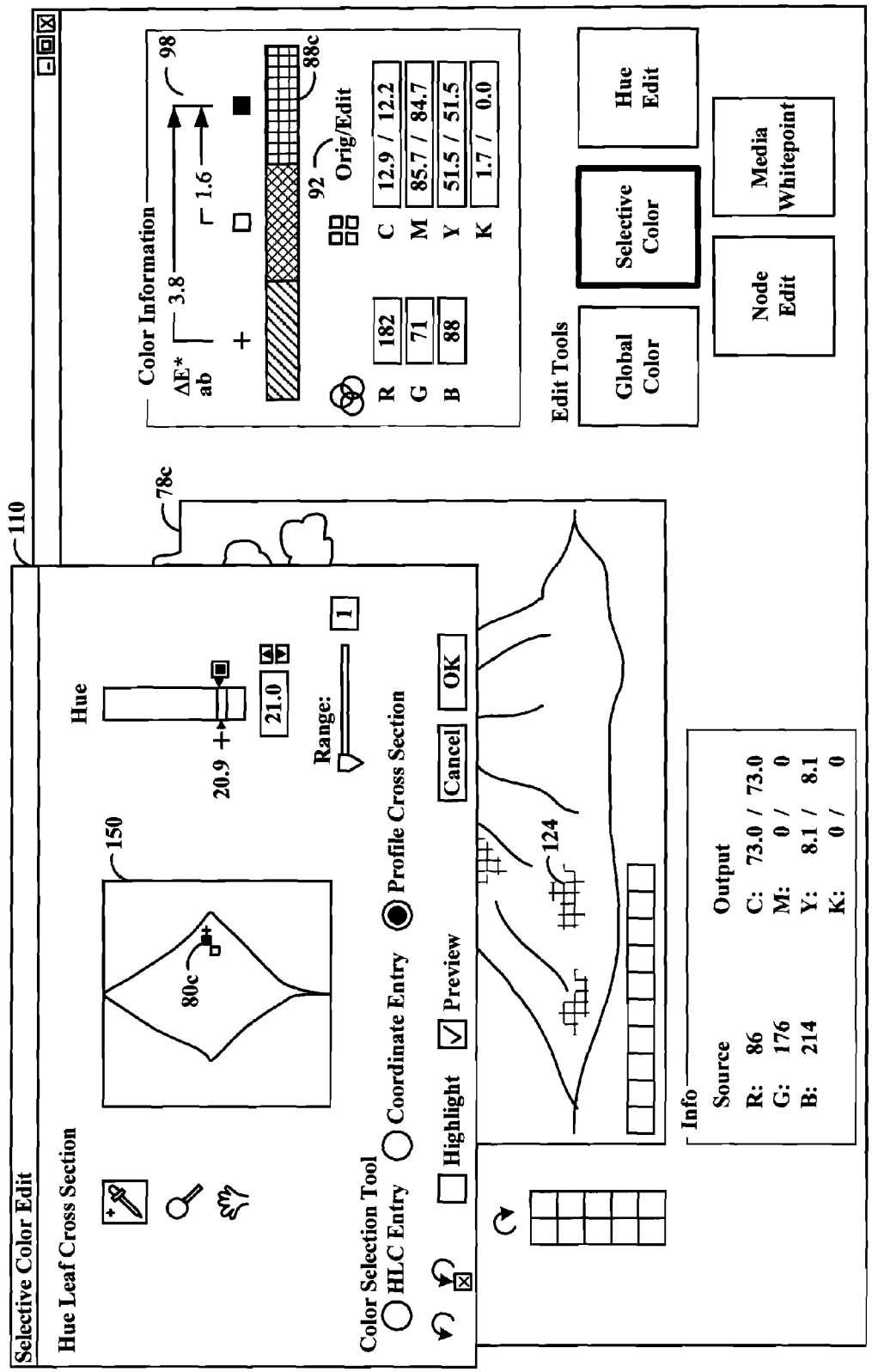
Figure 11C:
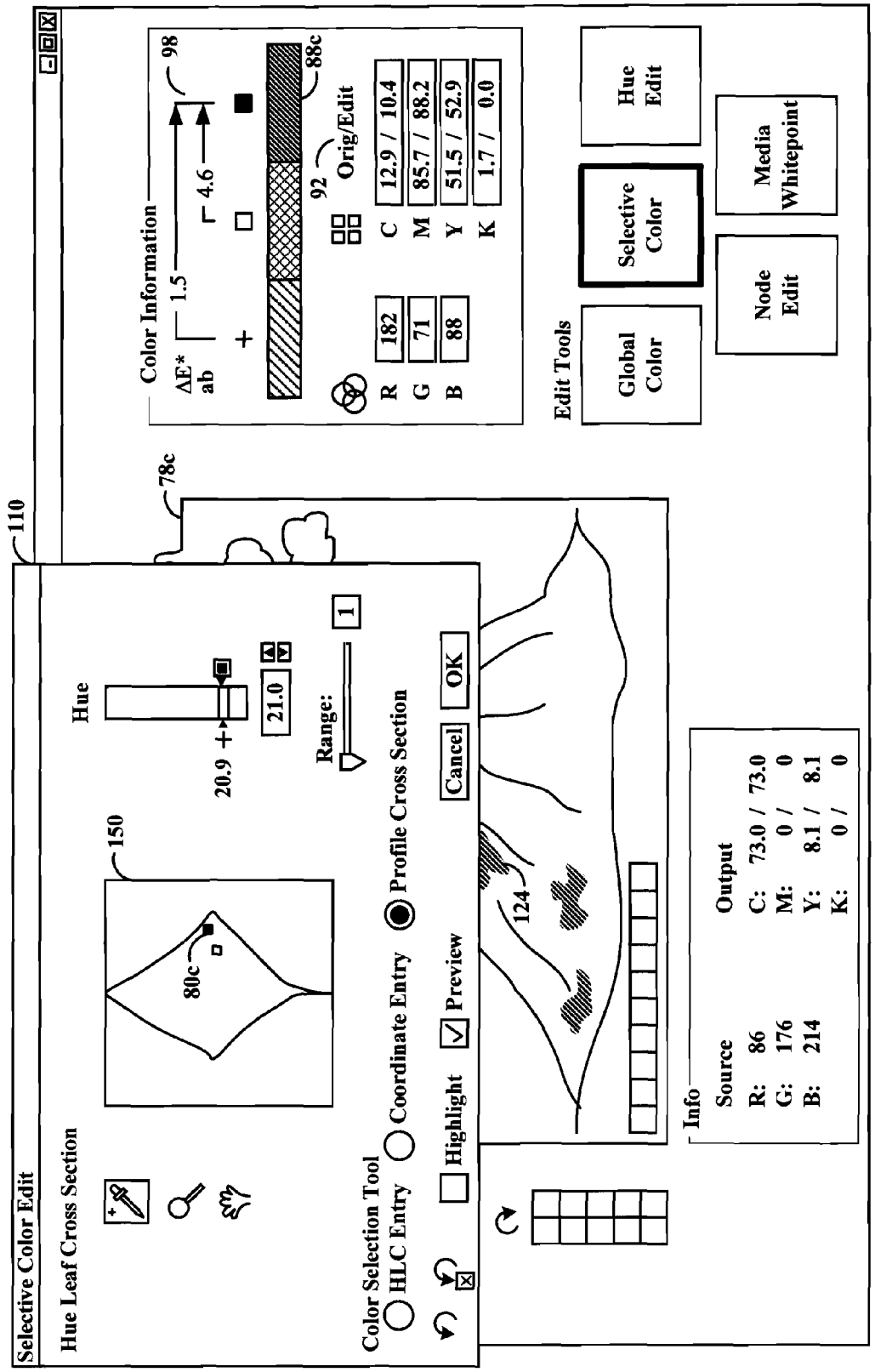
Figure 11D:
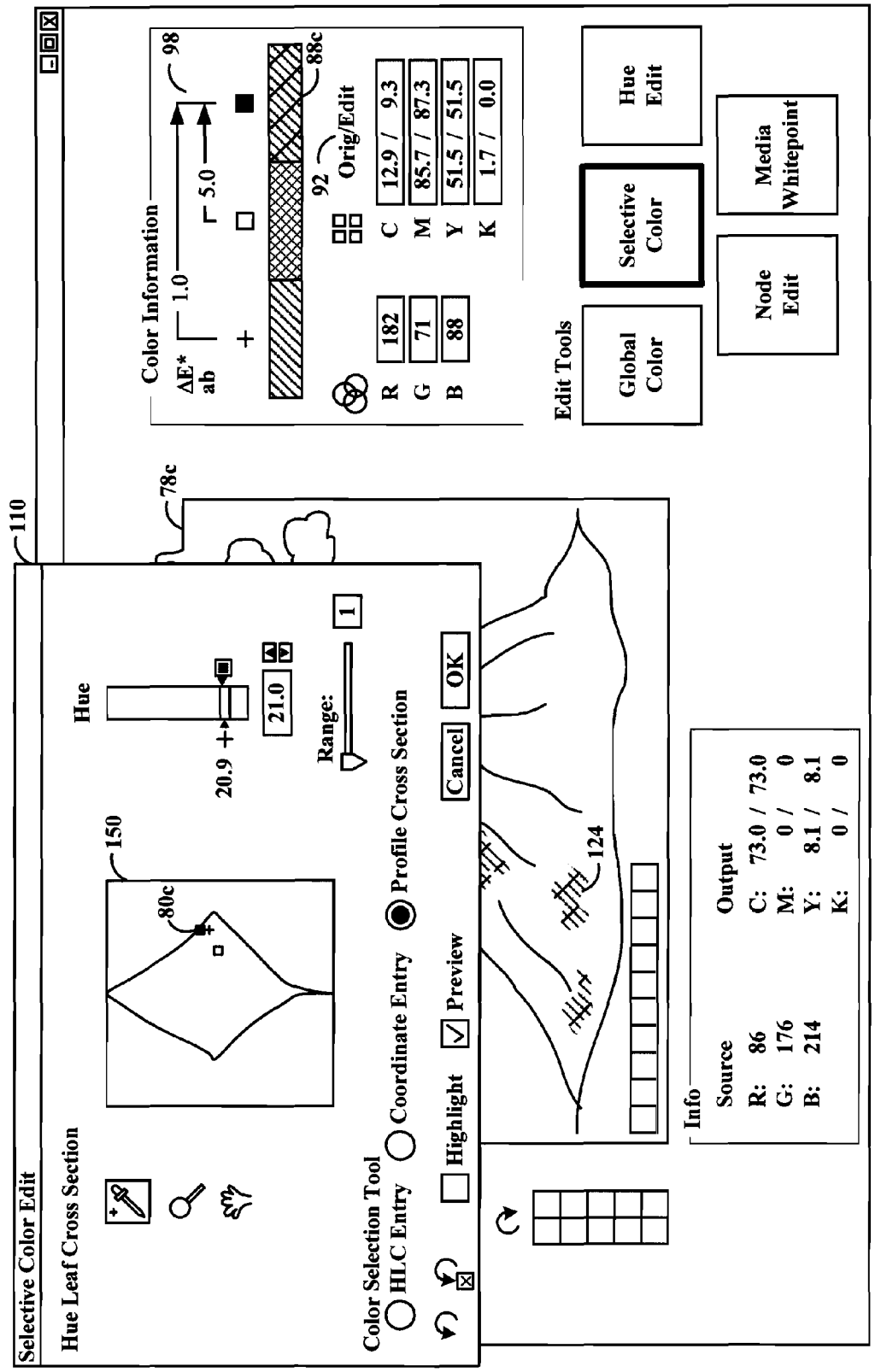

As shown in FIG. 11B-11D, a user may modify the lightness and chroma of the Selected Edited Output Color by dragging indicia 80*c* on hue leaf display window 150. In addition, a user may modify the hue $\alpha$ of the Selected Edited Output Color by clicking on control arrows 154, or by dragging indicia 80*c* on slider bar 156. As a user edits the Selected Edited Output Color, color processor module 26 calculates modified Selected Second Color Values corresponding to the modified Selected Edited Output Color, replaces the Selected Second Color Values with the modified Selected Second Color Values, and recalculates Output (Edited) Data, PCS Output (Edited) Data and Soft Proof Output (Edited) Data.

Further, user interface module 24 correspondingly modifies soft proof color patch 88c, output color data value display area 92 and color difference image area 98 to reflect the modified Selected Edited Output Color. In addition, if preview checkbox 122 is selected, Output (Edited) image 78c displays a preview of the modified Selected Edited Output Color 124 in the Output (Edited) soft proof image.

The previous two selective color edit tools have provided various graphical tools that allow a user to indirectly view and modify the Selected Second Color Values by viewing and modifying the hue, lightness and chroma values of the Selected Edited Output Color. Some users, however, prefer to directly view and modify the second color values in second color profile 38. Thus, referring now to FIG. 12A, an exemplary coordinate entry view of selective color edit window 110 is described. In particular, if a user selects Coordinate Entry radio button 114, selective color edit window 110 displays a "Replacement Color (Exact Coordinate Entry)" view, which includes data windows 156-158, for specifying the color data values of the Selected Input Color, Selected Output Color and Selected Second Color Values, respectively. A user may display the color data values in device-dependent (e.g., RGB, CMYK) or device-independent (e.g., XYZ, L*a*b*) coordinates.

Figure 12A:
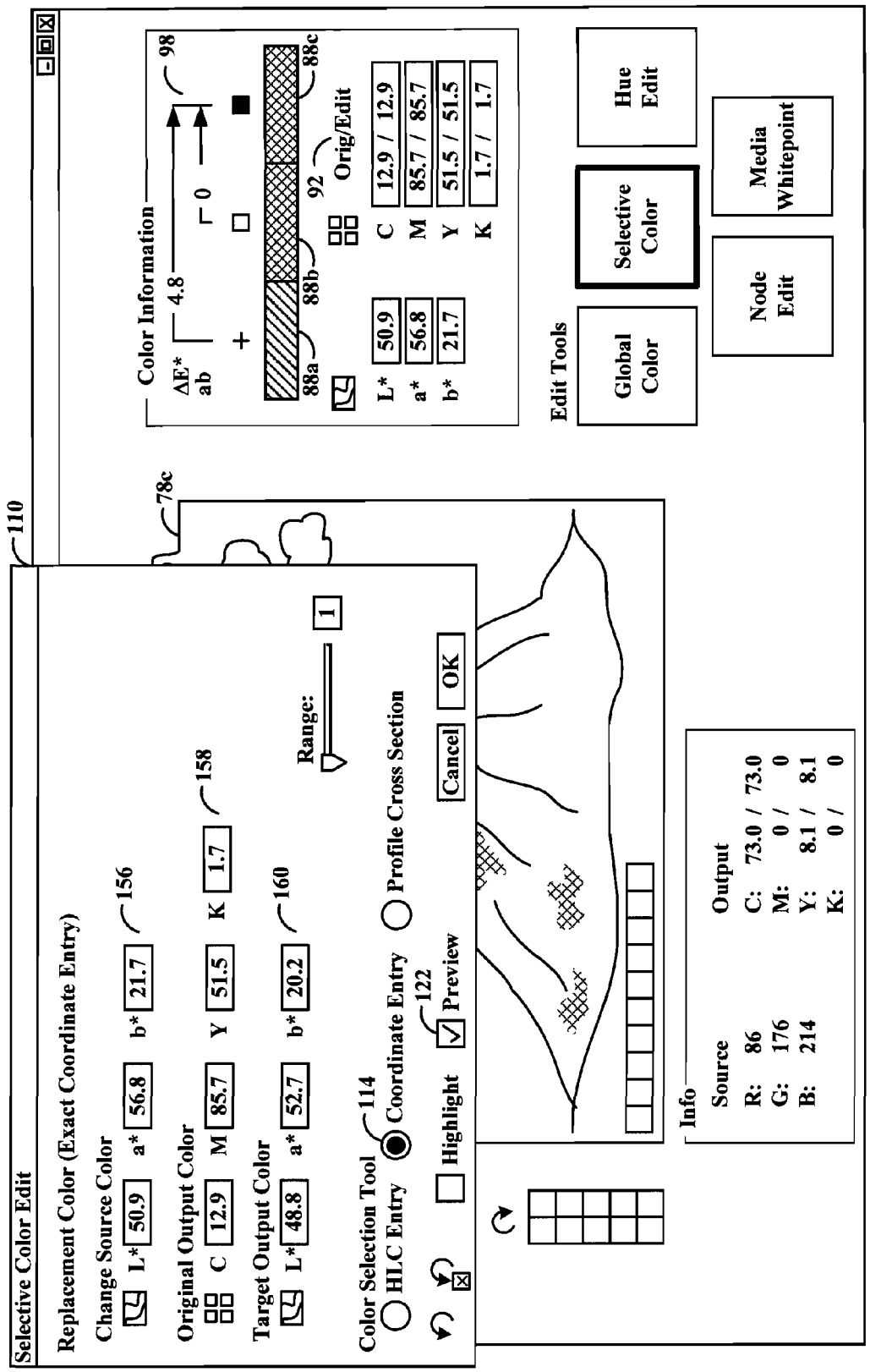
FIGS. 12A and 12B are views of an exemplary coordinate entry edit user interface of color profile editors in accordance with this invention.
Figure 12B:
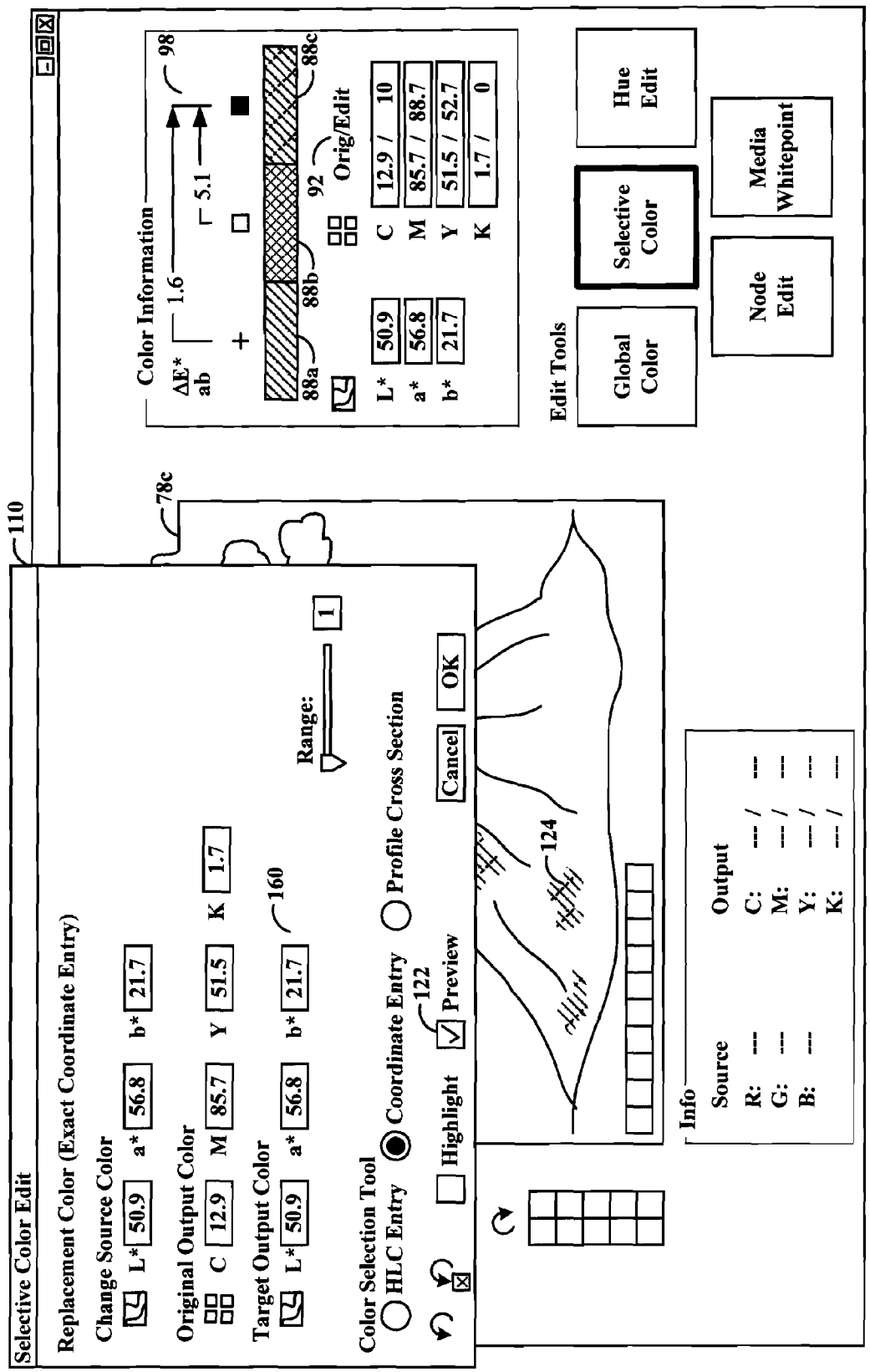

Further, as shown in FIGS. 12A and 12B, a user may modify the Selected Second Color Values by typing the desired values in data window 160. As a user edits second color values in second color profile 38, color processor module 26 recalculates Output (Edited) Data, PCS Output (Edited) Data and Soft Proof Output (Edited) Data, and user interface module 24 correspondingly modifies soft proof color patch 88c, output color data value display area 92 and color difference image area 98 to reflect the modified Selected Second Color Values. In addition, if preview checkbox 122 is selected, Output (Edited) image 78c displays a preview of the modified Selected Edited Output Color 124 in the Output (Edited) soft proof image. Further, a user may change the Selected Input Color by typing the desired values in data window 156. Accordingly, the data values displayed in data windows 158 and 160 will change to show the Selected Output Color and Selected Second Color Values corresponding to the new Selected Input Color.

As previously described, selective color edit tool 106 allows a user to indirectly or directly modify one or more Selected Second Color Values in second color profile 38. For some applications, a user may want to modify all second color values in second color profile 38 that have the same hue as the Selected Edited Output Color. For example, an image may include an object (e.g., a red ball) composed of numerous colors having the same hue α1, but at various degrees of lightness and intensity. If output device 20 is a printer used to print the image, a user may be unhappy about the appearance of the ball in the printed image (e.g., the reds may appear too orange). The user could attempt to correct this by modifying edited profile 38 using selective color edit tool 106. Such an approach, however, may require that the user selectively modify a large number of second color values in second color profile 38, which could be very time consuming. As an alternative, the user therefore may want to shift the hue of all second color values in second color profile 38 having hue α1 (e.g., making all of the reds appear less orange, and more purple).

Figure 13B:
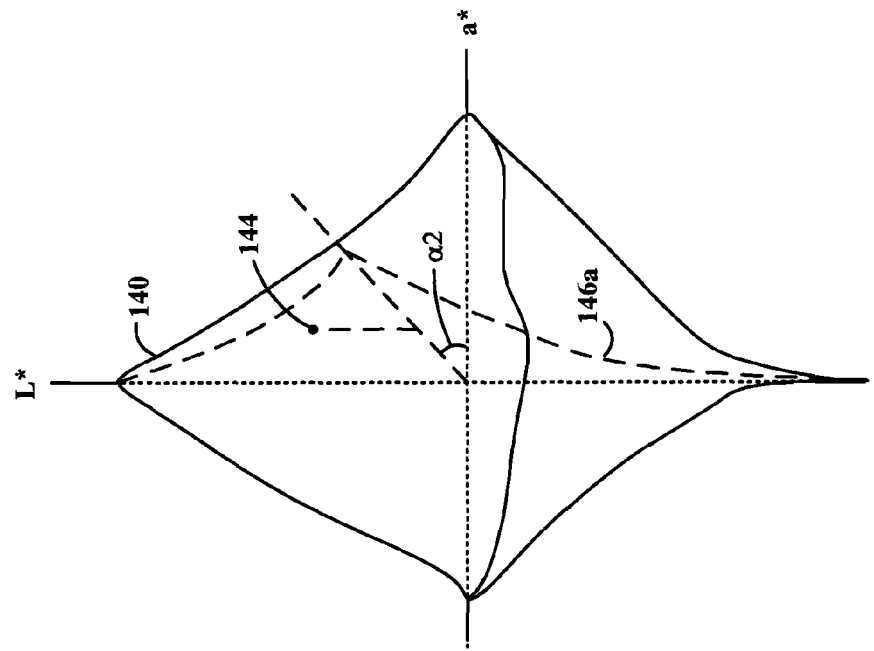
FIGS. 13A and 13B are additional views of an exemplary printer color gamut for use with color profile editors in accordance with this invention.
Figure 13A:
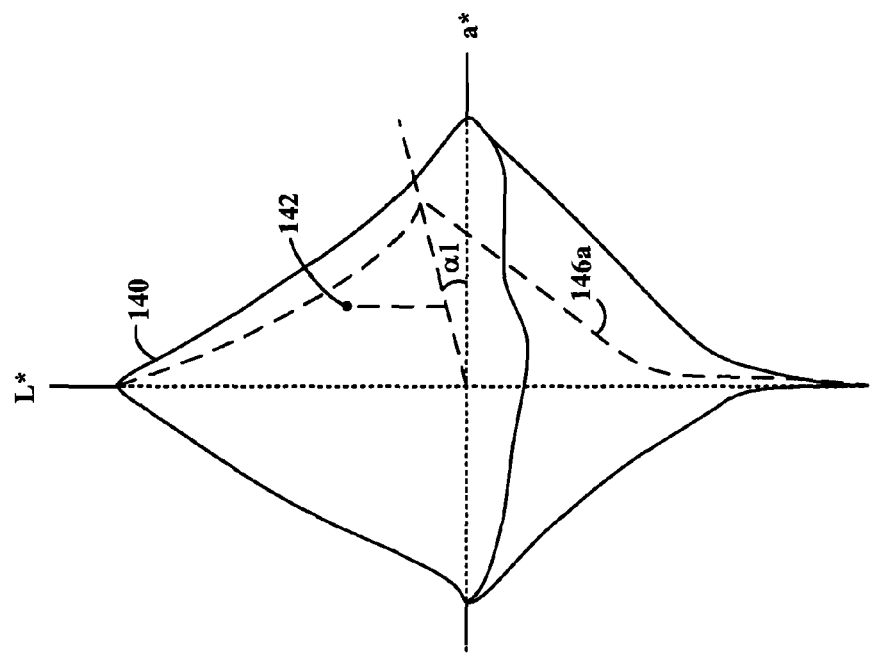

In particular, FIG. 13A illustrates exemplary color gamut 140, which includes Selected Edited Output Color 142, having a hue α1, and hue leaf half portion 146a, which includes all colors in color gamut 140 that also have hue α1. As shown in FIG. 13B, a user may want to shift the hue of the Selected Edited Output Color 142 from hue α1 to hue α2 (indicated by reference 144). Further, the user also may want to impose the same hue shift on all colors on hue leaf half portion 146a (referred to herein as the "Matching Hue Colors"). In accordance with this invention, hue edit tool 108 provides various tools that allow a user to modify the Selected Second Color Values and the second color values in second color profile 38 that correspond to the Matching Hue Colors (referred to herein as the "Matching Second Color Values").

Figure 14A:
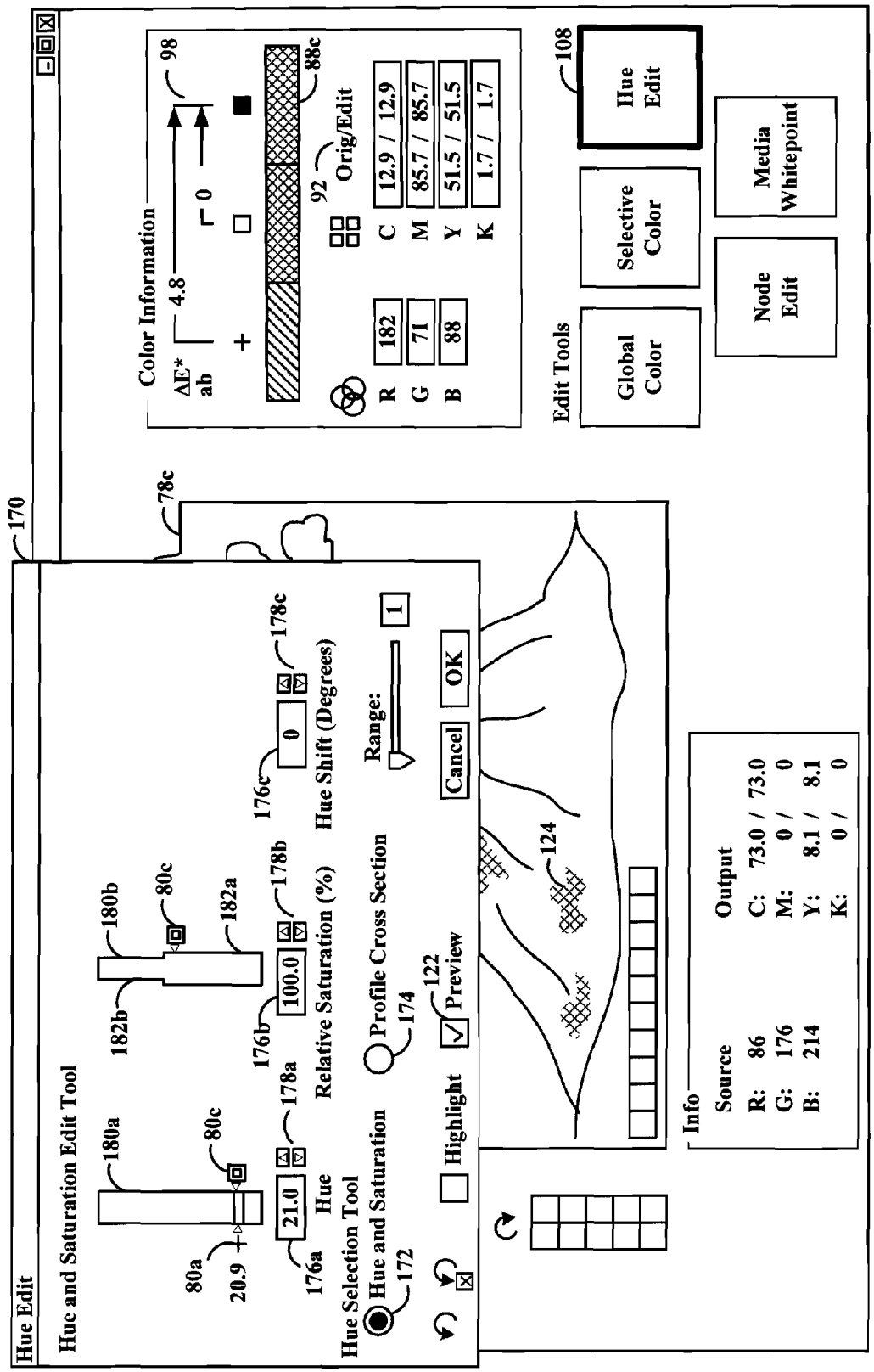
FIGS. 14A and 14B are views of an exemplary hue and saturation edit user interface of color profile editors in accordance with this invention.

Referring now to FIG. 14A, if a user clicks on hue edit tool 108, user interface module 24 displays a hue edit window in user interface 70, such as exemplary hue edit window 170 that allows a user to edit the hue of the Selected Edited Output Color and Matching Hue Colors. Exemplary hue edit window 170 includes radio buttons 172 and 174 that may be used to select various views for displaying and modifying the Selected Edited Output Color and Matching Hue Colors. In particular, radio buttons 172 and 174 may include "Hue and Saturation" and "Profile Cross Section" selections, respectively, which will be described in more detail below.

In particular, if a user selects Hue and Saturation radio button 172, color processor module 26 calculates the hue and relative saturation of the Selected Edited Output Color. As used herein, the relative saturation ("RS") of a color is equal to the ratio (in percent) of the saturation of the color to the saturation of the Selected Output Color:

$$RS = \frac{(Color)_{sat}}{(Selected\ OutputColor)_{sat}}$$

Thus, prior to editing, the relative saturation of the Selected Edited Output Color is 100%. Hue edit window 170 displays a "Hue and Saturation" view, which includes data windows 176a and 176b that display the calculated hue and relative saturation, respectively.

Further, hue edit window 170 displays control arrows 178a and 178b that may be used to modify the hue and relative saturation, respectively, of the Selected Edited Output Color and the Matching Hue Colors. In this regard, if a user modifies the relative saturation of the Selected Edited Output Color by a certain percentage, the relative saturation of the Matching Hue Colors will be modified by the same percentage. In addition, hue edit window 170 displays data window 176c and control arrow 178c that may be used to display and modify the hue shift of the Selected Edited Output Color and Matching Hue Colors.

As a user changes any of these values, color processor module 26 calculates modified Selected Second Color Values and Matching Second Color Values corresponding to the modified Selected Edited Output Color and Matching Hue Colors, and then replaces the Selected Second Color Values and Matching Second Color Values with the modified values. Further, color processor module 26 recalculates Output (Edited) Data, PCS Output (Edited) Data and Soft Proof Output (Edited) Data, and user interface module 24 correspondingly modifies soft proof color patch 88c, output color data value display area 92 and color difference image area 98 to reflect the modified Selected Edited Output Color and Matching Hue Colors. In addition, if preview checkbox 122 is selected, Output (Edited) image 78c displays a preview of the modified Selected Edited Output Color 124 and Matching Hue Colors in the Output (Edited) soft proof image.

Moreover, dynamic slider bar 180a displays information about the hue of the Selected Input Color, Selected Output Color and Selected Edited Output colors, and dynamic slider bar 180*b* displays information about the relative saturation of the Selected Edited Output color. Dynamic slider bar 180*a* includes indicia 80*a*-80*c* to indicate the hue of the Selected Input Color, Selected Output Color and Selected Edited Output Color, respectively, and also numerically display the Selected Input Color hue data value. Dynamic slider bar 180*b* includes indicia 80*b* and 80*c* to indicate the relative saturation of the Selected Output Color and Selected Edited Output Color, respectively.

Figure 14B:
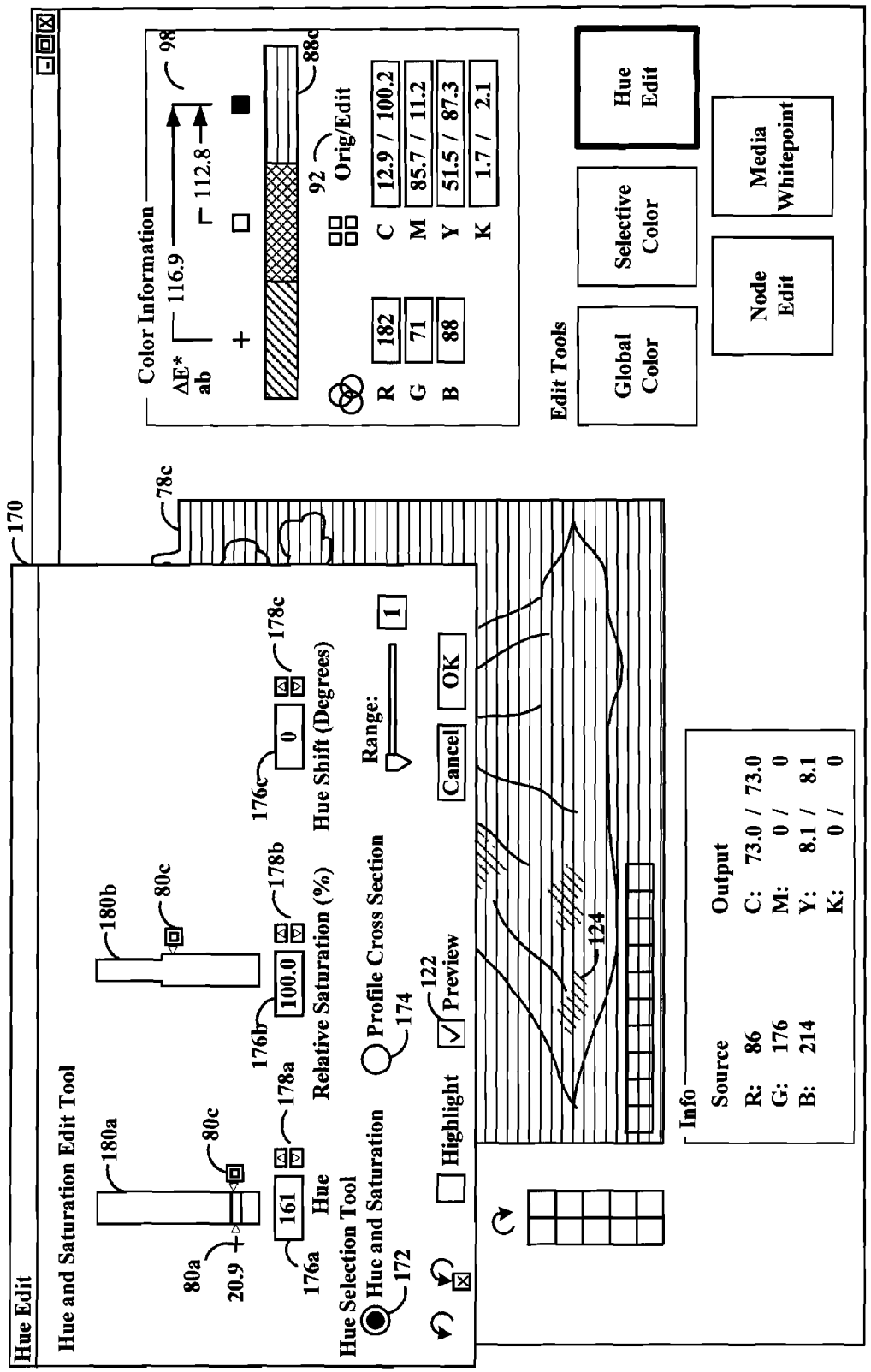

In addition, a user may modify the hue and relative saturation of the Selected Edited Output Color and Matching Hue Colors by dragging indicia 80*c* on the corresponding slider bars 180*a* and 180*c*, respectively. Thus, FIG. 14B illustrates indicia 80*c* on slider bar 180 dragged up to change the hue of the Selected Edited Output Color and Matching Hue Colors to 161. As in the previous examples, as a user modifies the Selected Edited Output Color and Matching Hue Colors, color processor module 26 calculates modified Selected Second Color Values and Matching Second Color Values corresponding to the modified Selected Edited Output Color and Matching Hue Colors, replaces the Selected Second Color Values and Matching Second Color Values with the modified values, and then recalculates Output (Edited) Data, PCS Output (Edited) Data and Soft Proof Output (Edited) Data. Further, user interface module 24 correspondingly modifies soft proof color patch 88*c*, output color data value display area 92, color difference image area 98 and Output (Edited) image 78*c* to reflect the modified Selected Second Color Values and Matching Second Color Values.

In addition to allowing a user to change the relative saturation of the Selected Edited Output Color and Matching Hue Colors, dynamic slider bar 180*b* also conveys information regarding available relative saturation values in the color gamut of output device 20. In particular, the height of relative saturation slider bar 180*b* represents the entire range of saturation values for all colors that have the same hue as the Selected Edited Output Color. Dynamic slider bar 180*b* is divided into two segments, with the width of each segment varying to indicate whether each value in each range is in the color gamut of the output device. A full width segment 182*a* indicates a color that is in gamut at the relative saturation value of the Selected Edited Output Color. A narrow segment 182*b* indicates a color that is out of gamut. Persons of ordinary skill in the art will understand that other techniques may be used to distinguish in gamut from out of gamut colors on dynamic slider bar 180*b*. For example, relative saturation slider bar 180*b* may be divided into multiple segments, with the segment colors varying to indicate whether each value in each range is in the color gamut of the output device.

In this regard, if a user would like to change the relative saturation of the Selected Edited Output Color and Matching Hue Colors to a value in segment 182*b* of relative saturation slider bar 180*b*, the user may visually deduce that no color at such a relative saturation value is the gamut of output device 20. Moreover, as a user changes any of the hue or relative saturation of the Selected Edited Output Color and Matching Hue Colors, the width (or color) of slider bar 180*b* dynamically adjusts to reflect the change. In this regard, the user is continually apprised of the available color values in the color gamut of output device 20.

Although Hue and Saturation tool 172 allows a user to display information about and modify the Selected Edited Output Color and Matching Hue Colors using data windows 176*a*-178*c*, control arrows 178*a*-178*c* and dynamic slider bars 180*a* and 180*b*, some users may prefer to view and modify the Selected Edited Output Color and Matching Hue Colors in relation to the color gamut of output device 20.

Figure 15B:
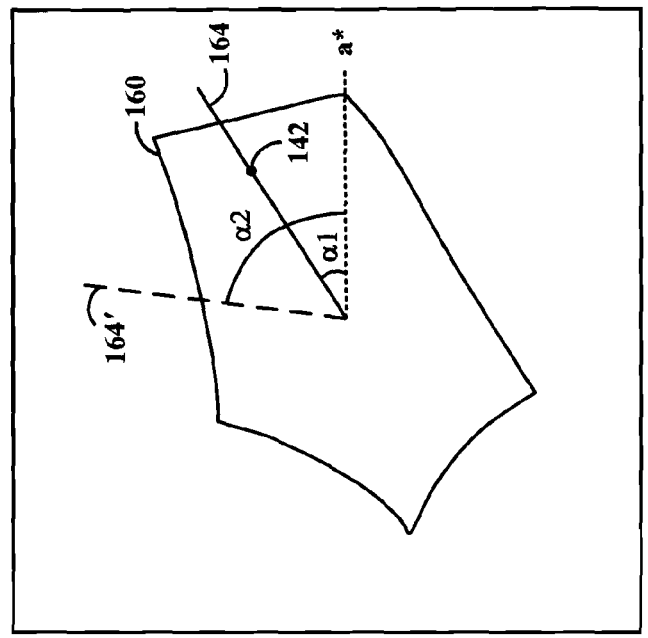
FIGS. 15A and 15B are additional views of an exemplary printer color gamut for use with color profile editors in accordance with this invention.
Figure 15A:
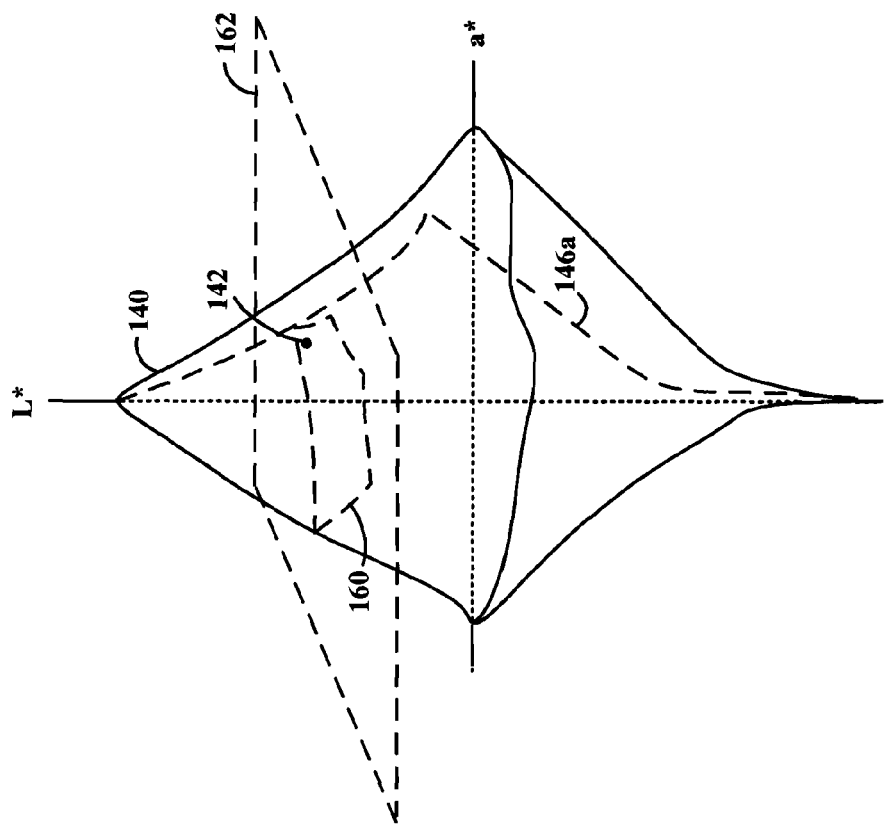

Referring now to FIGS. 15A and 15B, additional exemplary views of color gamut 140 are described. In particular, FIG. 15A illustrates a cross section 160 of color gamut 140, including constant lightness plane 162. Selected Edited Output Color 142 lies in lightness plane 162 and in hue leaf half portion 146*a*. FIG. 15B illustrates a two-dimensional view of cross section 160, including Selected Edited Output Color 142, and projection 164 of Matching Hue Colors. In accordance with this invention, profile editor 12 allows the user to modify the hue of all colors that lie along projection 164 in second color profile 38 (e.g., by shifting projection 164 at hue angle α1 to modified projection 164' at hue angle α2) by graphically editing colors on cross section 160. In addition, profile editor 12 allows the user to modify the relative saturation of all colors that lie along projection 164 in second color profile 38 by graphically editing colors on cross section 160.

Figure 16A:
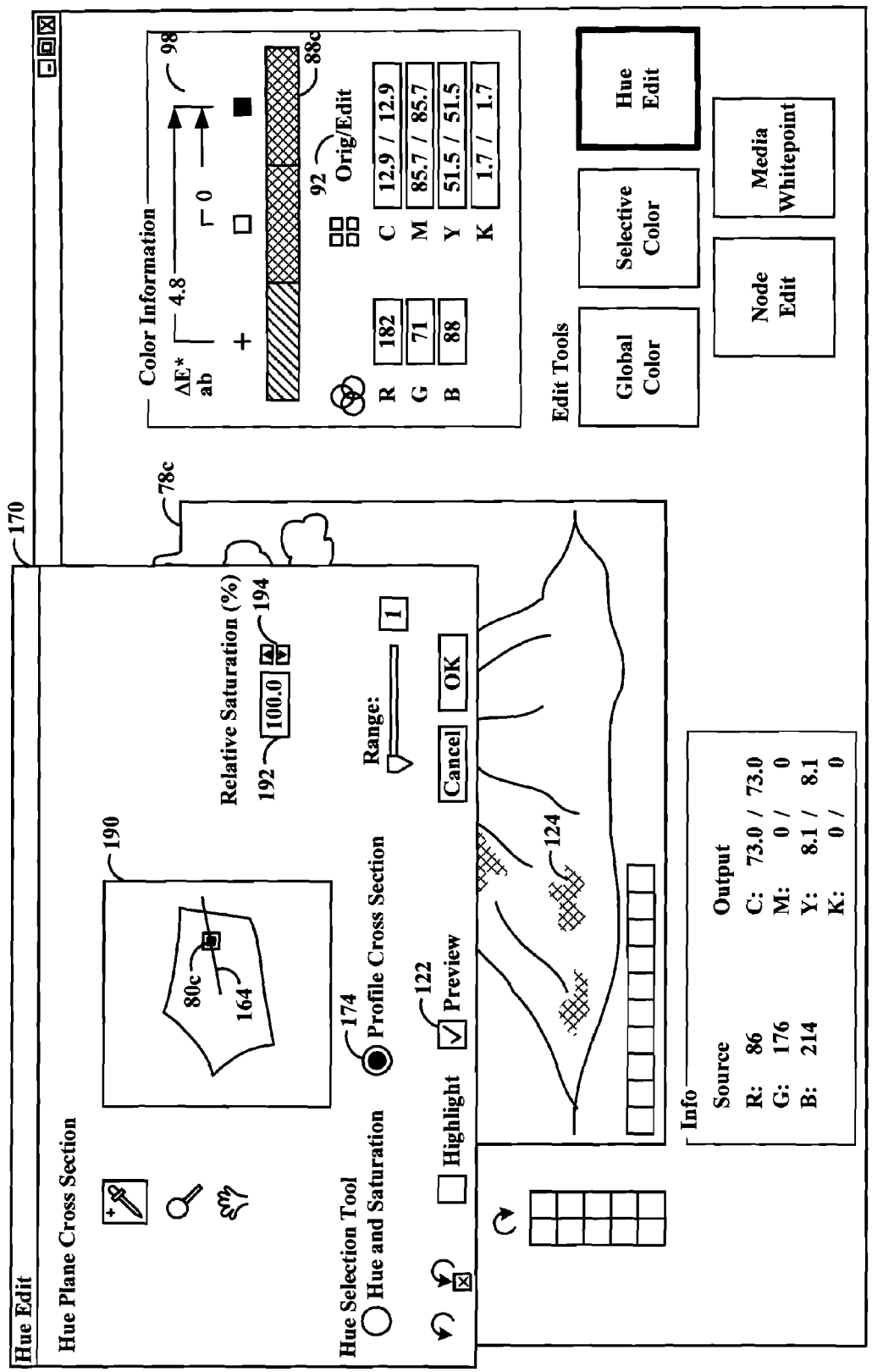
FIGS. 16A and 16B are views of an exemplary hue plane edit user interface of color profile editors in accordance with this invention.

In particular, referring to FIG. 16A, if a user selects Profile Cross Section radio button 174, hue edit window 170 displays a "Hue Plane Cross Section" view, which includes hue plane display window 190, data window 192 and control arrows 194 for displaying and changing the hue and relative saturation of the Selected Edited Output Color and Matching Hue Colors. Hue plane display window 190 includes indicia 80*a*-80*c* to indicate the hue and relative saturation of Selected Input Color, Selected Output Color and Selected Edited Output Color, respectively. In addition, data window 192 displays the relative saturation of the Selected Edited Output Color.

Figure 16B:
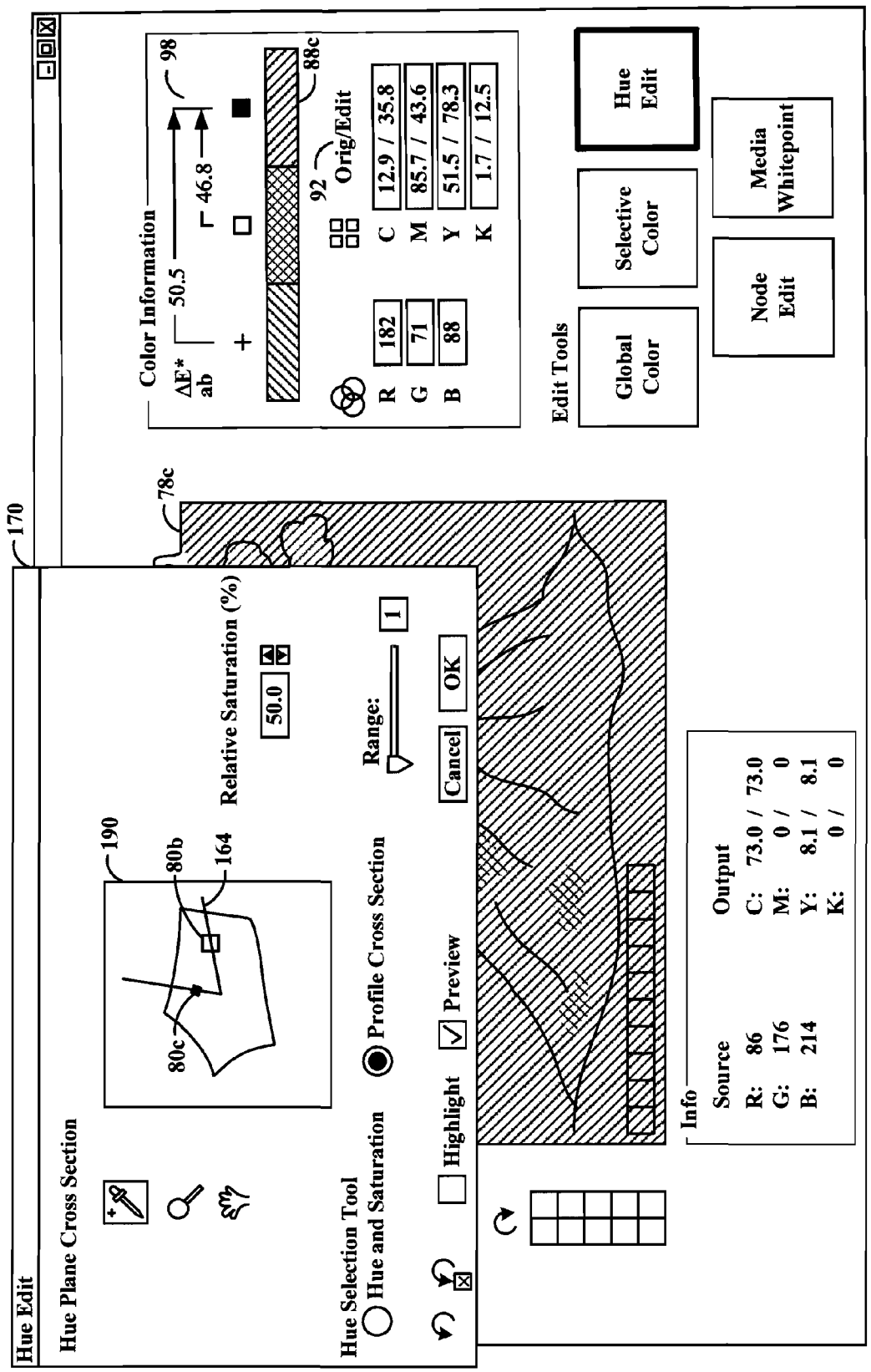

As shown in FIG. 16B, a user may modify the hue of the Selected Edited Output Color and Matching Hue Colors by dragging and rotating indicia 80*c* on hue plane display window 190. As a user changes the hue, color processor module 26 calculates modified Selected Second Color Values and Matching Second Color Values corresponding to the modified Selected Edited Output Color and Matching Hue Colors, replaces the Selected Second Color Values and Matching Second Color Values with the modified values, and then recalculates Output (Edited) Data, PCS Output (Edited) Data and Soft Proof Output (Edited) Data, and user interface module 24 correspondingly updates soft proof color patch 88*c*. Further, output color data value display area 92 and color difference image area 98 to reflect the modified Selected Edited Output Color. In addition, if preview checkbox 122 is selected, Output (Edited) image 78*c* displays a preview of the modified Selected Edited Output Color 124 and Matching Hue Colors in the Output (Edited) soft proof image.

Further, a user may modify the relative saturation of the Selected Edited Output Color and Matching Hue Colors by dragging indicia 80*c* along the length of projection 164 on hue plane display window 190. In this regard, if a user modifies the relative saturation of the Selected Edited Output Color by a certain percentage, the relative saturation of the Matching Hue Colors will be modified by the same percentage. As a user changes the relative saturation values, color processor module 26 calculates modified Selected Second Color Values and Matching Second Color Values corresponding to the modified Selected Edited Output Color and Matching Hue Colors, replaces the Selected Second Color Values and Matching Second Color Values with the modified values, and then recalculates Output (Edited) Data, PCS Output (Edited) Data and Soft Proof Output (Edited) Data, and user interface module 24 correspondingly updates soft proof color patch 88*c*. Further, output color data value display area 92 and color difference image area 98 to reflect the modified Selected Edited Output Color. In addition, if preview checkbox 122 is selected, Output (Edited) image 78*c* displays a preview of the modified Selected Edited Output Color 124 and Matching Hue Colors in the Output (Edited) soft proof image.

Although the above exemplary embodiments have described the invention primarily in terms of editing output profiles, persons of ordinary skill in the art will understand that methods and apparatus in accordance with this invention also may be used to edit input profiles and display profiles. Further, persons of ordinary skill in the art will understand that methods and apparatus in accordance with this invention also may be used to edit output profiles that characterize abstract color spaces, file formats, or other similar output color spaces. In addition, persons of ordinary skill in the art will understand that various modifications can be made by without departing from the scope and spirit of this invention.

The invention claimed is:

1. A method for processing input data, the method comprising:
    using a first color profile to convert the input data to first output data;
    using a second color profile to convert the input data to second output data, wherein the second color profile comprises an edited version of the first color profile;
    calculating soft proof data corresponding to the input data, first output data and second output data;
    displaying, on a display, a first soft proof image computed from the soft proof data corresponding to the input data, a second soft proof image computed from the soft proof data corresponding to the first output data and a third soft proof image computed from the soft proof data corresponding to the second output data on a display device;
    wherein the first soft proof image computed from the soft proof data corresponding to the input data further comprises converting the input data to equivalent PCS input data in a profile connection space and using a display profile to convert the PCS input data to said soft proof data in the color space of the display;
    providing a processor configured for:
        receiving edited values of said second color profile; and
        responsive to receiving said edited values, recalculating said second output data, PCS output edited data, and said soft proof data corresponding to the recalculated second output data;
    responsive to said recalculating, redisplaying on said display:
        a modified soft proof color patch, output color data value display, color difference image area to reflect said received edited values of said second color profile, and said recalculated third soft proof image;
    providing a processor configured for:
        receiving edited values for said input data;
        responsive to receiving said edited input data, updating said first output data and said second output data; and
        responsive to updating said first output data and said second output data, displaying said updated first output data and said updated second output data; and
    providing a processor configured for receiving user inputs from a user-operated tool which effect a change to any of a first hue, a first lightness, and a first chroma, dynamically adjusting and distinctly redisplaying on said user-operated tool information that is in an output device's gamut and that is out of the output device's gamut, said information relating to corresponding lightness values and corresponding chroma values;
    wherein said user-operated tool comprises a lightness slider bar and a chroma slider bar, each of which is divided into multiple segments, with the width of the segments varying to indicate whether each value in each range is in the color gamut of the output device, where a full width segment indicates a color that is in gamut at the current value of lightness and chroma, a narrow segment indicates a color that is in gamut, but at a different value of chroma or lightness, respectively, and where a line segment indicates a color that is out of gamut;
    wherein when the user changes the chroma on said user-operated tool to a value in a particular segment of the chroma slider bar, the segments of the chroma slide bar on the user-operated tool enable the user to visually deduce that a color at said chroma value is in gamut, but at a different lightness, when the user changes the lightness on said user-operated tool to a value in a particular segment of the lightness slider bar, the segments of the lightness slide bar on the user-operated tool enable the user to visually deduce that a color at said lightness value is in gamut, but at a different chroma, when the user changes a lightness to another value in a particular segment of the lightness slider bar, the user may visually deduce that no color at the lightness value is in gamut at any chroma, and when the user changes a chroma to another value in a particular segment of the chroma slider bar, the user may visually deduce that no color at the chroma value is in gamut at any lightness; and
    wherein as a user changes any of the hue, lightness or chroma on said user-operated tool, the widths of the slider bars dynamically adjust to reflect the change;
    whereby the user is continually apprised of the available color values in the color gamut of the output device.

2. The method of claim 1, wherein the input data comprises red, green and blue ("RGB") data.

3. The method of claim 1, wherein the input data comprises cyan, magenta, yellow and black ("CMYK") data.

4. The method of claim 1, wherein the input data comprises data in a device-independent color space.

5. The method of claim 4, wherein the device-independent color space comprises an L*a*b* color space.

6. The method of claim 1, wherein the input data comprise reference data.

7. The method of claim 1, wherein the input data comprise digital camera data.

8. The method of claim 1, wherein the input data comprise digital scanner data.

9. The method of claim 1, wherein the input data comprise device-independent color data for commonly perceived colors, such as skin tones, sky, vegetation and earth tones.

10. The method of claim 1, wherein displaying comprises simultaneously displaying the soft proof data corresponding to the input data, first output data and second output data on the display device.

11. The method of claim 1, wherein displaying comprises selectively displaying the soft proof data corresponding to the input data, first output data and second output data on the display device.

12. The method of claim 1, wherein the input data, first output data and second output data comprise color data values, and displaying further comprises displaying the color data values of the input data, first output data and second output data.

13. The method of claim 12, wherein displaying the color data values comprises selectively displaying the color data values as L*a*b*, XYZ, RGB or CMYK color data values.

14. The method of claim 1, wherein the input data, first output data and second output data comprise color data values, and displaying comprises displaying a soft proof of color patches having color values that substantially match the color values of the input data, first output data and second output data.

15. The method of claim 1, wherein the input data, first output data and second output data comprise color data values, and displaying comprises displaying the color data values of the input data, first output data and second output data and displaying a soft proof of color patches having color values that substantially match the color values of the input data, first output data and second output data.

16. The method of claim 1, wherein displaying comprises displaying substantially all of the soft proof data corresponding to the input data, first output data and second output data input data on the display device.

17. The method of claim 1, wherein displaying comprises selectively displaying a soft proof of a sample of the input image data, first output image data and second output image data on the display device.

18. The method of claim 1, further comprising:
receiving a user selection of a sample of the input data;
calculating corresponding samples of the first output data and second output data; and
displaying a soft proof of the sample of the input data and the corresponding samples of the first output data and second output data on the display device.

19. The method of claim 1, further comprising displaying indicia uniquely associated with the input data, first output data and second output data.

20. The method of claim 19, wherein the indicia comprise any of symbols, letters and numbers.

21. The method of claim 1, wherein the first and second color profiles comprise printer profiles.

22. The method of claim 1, wherein the display device has an associated display profile that characterizes a color space of the display device, and wherein displaying a soft proof further comprises converting the input data, first output data and second output data to the color space of the display device.

23. The method of claim 1, further comprising calculating a first color difference between the input data and the first output data, and a second color difference between the first output data and the second output data.

24. The method of claim 23, further comprising displaying the first color difference and the second color difference on the display device.

25. The method of claim 1, further comprising:
identifying a difference between the first output data and the second output data; and
modifying the second output data to indicate the difference in the soft proof of the second output data.

26. The method of claim 25, wherein the first output data and the second output data each comprise a plurality of pixels, each pixel comprising a plurality of color values, and wherein:
identifying comprises identifying second output data pixels having color values that differ from color values of corresponding first output data pixels; and
modifying comprises changing the color values of the identified pixels to emphasize the difference in the soft proof of the second output image data.

27. Apparatus for processing input data corresponding to an image, the apparatus configured for:
converting the input data to first output data using a first color profile;
converting the input data to second output data using a second color profile, wherein the second color profile comprises an edited version of the first color profile;
calculating soft proof data corresponding to the input data, first output data and second output data;
displaying, on a display, a first soft proof image computed from the soft proof data corresponding to the input data, a second soft proof image computed from the soft proof data corresponding to the first output data and a third soft proof image computed from the soft proof data corresponding to the second output data on a display device;
wherein the first soft proof image computed from the soft proof data corresponding to the input data further comprises converting the input data to equivalent PCS input data in a profile connection space and using a display profile to convert the PCS input data to said soft proof data in the color space of the display;
wherein the apparatus provides a processor configured for:
receiving edited values of said second color profile; and
responsive to receiving said edited values, recalculating said second output data, PCS output edited data, and said soft proof data corresponding to the recalculated second output data;
responsive to said recalculating, redisplaying on said display:
a modified soft proof color patch, output color data value display, color difference image area to reflect said received edited values of said second color profile, and said recalculated third soft proof image;
wherein the apparatus provides a processor configured for:
receiving edited values for said input data;
responsive to receiving said edited input data, updating said first output data and said second output data; and
responsive to updating said first output data and said second output data, displaying said updated first output data and said updated second output data; and
wherein the apparatus provides a processor configured for receiving user inputs from a user-operated tool which effect a change to any of a first hue, a first lightness, and a first chroma, dynamically adjusting and distinctly redisplaying on said user-operated tool information that is in an output device's gamut and that is out of the output device's gamut, said information relating to corresponding lightness values and corresponding chroma values;
wherein said user-operated tool comprises a lightness slider bar and a chroma slider bar, each of which is divided into multiple segments, with the width of the segments varying to indicate whether each value in each range is in the color gamut of the output device, where a full width segment indicates a color that is in gamut at the current value of lightness and chroma, a narrow segment indicates a color that is in gamut, but at a different value of chroma or lightness, respectively, and where a line segment indicates a color that is out of gamut;
wherein when the user changes the chroma on said user-operated tool to a value in a particular segment of the chroma slider bar, the segments of the chroma slide bar on the user-operated tool enable the user to visually deduce that a color at said chroma value is in gamut, but at a different lightness, when the user changes the lightness on said user-operated tool to a value in a particular segment of the lightness slider bar, the segments of the lightness slide bar on the user-operated tool enable the user to visually deduce that a color at said lightness value is in gamut, but at a different chroma, when the user changes a lightness to another value in a particular segment of the lightness slider bar, the user may visually deduce that no color at the lightness value is in gamut at any chroma, and when the user changes a chroma to another value in a particular segment of the chroma slider bar, the user may visually deduce that no color at the chroma value is in gamut at any lightness; and wherein as a user changes any of the hue, lightness or chroma on said user-operated tool, the widths of the slider bars dynamically adjust to reflect the change;

whereby the user is continually apprised of the available color values in the color gamut of the output device.

28. The apparatus of claim 27, wherein the input data comprises red, green and blue ("RGB") data.

29. The apparatus of claim 27, wherein the input data comprises cyan, magenta, yellow and black ("CMYK") data.

30. The apparatus of claim 27, wherein the input data comprises data in a device-independent color space.

31. The apparatus of claim 30, wherein the device-independent color space comprises an L*a*b* color space.

32. The apparatus of claim 27, wherein the input data comprise reference data.

33. The apparatus of claim 27, wherein the input data comprise digital camera data.

34. The apparatus of claim 27, wherein the input data comprise digital scanner data.

35. The apparatus of claim 27, wherein the input data comprise device-independent color data for commonly perceived colors, such as skin tones, sky, vegetation and earth tones.

36. The apparatus of claim 27, wherein means for displaying comprises means for simultaneously displaying the soft proof data corresponding to the input data, first output data and second output data on the display device.

37. The apparatus of claim 27, wherein means for displaying comprises means for selectively displaying the soft proof data corresponding to the input data, first output data and second output data on the display device.

38. The apparatus of claim 27, wherein the input data, first output data and second output data comprise color data values, and means for displaying further comprises means for displaying the color data values of the input data, first output data and second output data.

39. The apparatus of claim 27, wherein means for displaying the color data values comprises means for selectively displaying the color data values as L*a*b*, XYZ, RGB or CMYK color data values.

40. The apparatus of claim 27, wherein the input data, first output data and second output data comprise color data values, and means for displaying comprises means for displaying a soft proof of color patches having color values that substantially match the color values of the input data, first output data and second output data.

41. The apparatus of claim 27, wherein the input data, first output data and second output data comprise color data values, and means for displaying comprises means for displaying the color data values of the input data, first output data and second output data and means for displaying a soft proof of color patches having color values that substantially match the color values of the input data, first output data and second output data.

42. The apparatus of claim 27, wherein means for displaying comprises means for displaying substantially all of the soft proof data corresponding to the input data, first output data and second output data input data on the display device.

43. The apparatus of claim 27, wherein means for displaying comprises means for selectively displaying a soft proof of a sample of the input image data, first output image data and second output image data on the display device.

44. The apparatus of claim 27, further comprising:
means for receiving a user selection of a sample of the input data;
means for calculating corresponding samples of the first output data and second output data; and
means for displaying a soft proof of the sample of the input data and the corresponding samples of the first output data and second output data on the display device.

45. The apparatus of claim 27, further comprising means for displaying indicia uniquely associated with the input data, first output data and second output data.

46. The apparatus of claim 45, wherein the indicia comprise any of symbols, letters and numbers.

47. The apparatus of claim 27, wherein the first and second color profiles comprise printer profiles.

48. The apparatus of claim 27, wherein the display device has an associated display profile that characterizes a color space of the display device, and wherein means for displaying a soft proof further comprises means for converting the input data, first output data and second output data to the color space of the display device.

49. The apparatus of claim 27, further comprising means for calculating a first color difference between the input data and the first output data, and a second color difference between the first output data and the second output data.

50. The apparatus of claim 49, further comprising means for displaying the first color difference and the second color difference on the display device.

51. The apparatus of claim 27, further comprising:
means for identifying a difference between the first output data and the second output data; and
means for modifying the second output data to indicate the difference in the soft proof of the second output data.

52. The apparatus of claim 50, wherein the first output data and the second output data each comprise a plurality of pixels, each pixel comprising a plurality of color values, and wherein:
means for identifying comprises means for identifying second output data pixels having color values that differ from color values of corresponding first output data pixels; and
means for modifying comprises means for changing the color values of the identified pixels to emphasize the difference in the soft proof of the second output image data.

53. The method of claim 1, further comprising:
receiving, with a computer, an output color comprising a first hue;
displaying, with the computer, on a user-operated tool on a display device a two-dimensional cross-section of the color gamut along a constant hue plane at the first hue;
displaying, with the computer, an original soft proof image;
providing, with the computer, a user interface on the user-operated tool that permits a user (a) to create an edited soft proof image and (b) to modify either of the hue or saturation of the output color to create an edited output color, said modifying comprising dragging and rotating, via the user-operated tool, indicia on the two-dimensional cross-section to modify the hue and dragging, via the user-operated tool, indicia along the length of a projection on the two-dimensional cross-section to modify the saturation, and wherein said modifying dynamically updates a soft proof color patch displayed on said display device;
redisplaying, with the computer, the edited soft proof image; and redisplaying, with the computer, on the user-operated tool on the display device indicia of the output color and the edited output color on the color profile cross section;

wherein the color gamut comprises a boundary between colors that are in-gamut and out of gamut; and displaying, with the computer, and via the user-operated tool, indicia of the gamut boundary on the color profile cross section display, wherein said indicia comprises distinct widths of said two-dimensional cross-section at given points in said two-dimensional cross-section;

whereby the user is continually apprised, via the user-operated tool, of the available color values in the color gamut of the output device.

54. The method of claim 53, wherein the user interface on the user-operated tool permits the user to modify the edited output color by dragging, via the user-operated tool, the indicia of the edited output color on the color profile cross section display.

* * * * *